(12) United States Patent
Urakawa

(10) Patent No.: US 8,248,644 B2
(45) Date of Patent: Aug. 21, 2012

(54) COMMUNICATION APPARATUS

(75) Inventor: Yutaka Urakawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 831 days.

(21) Appl. No.: 12/364,481

(22) Filed: Feb. 2, 2009

(65) Prior Publication Data
US 2009/0195828 A1 Aug. 6, 2009

(30) Foreign Application Priority Data
Jan. 31, 2008 (JP) .................................. 2008-020410

(51) Int. Cl.
*G06F 3/12* (2006.01)
*G06K 15/00* (2006.01)

(52) U.S. Cl. ...................................... 358/1.15; 358/1.16

(58) Field of Classification Search .................. 358/1.15, 358/400, 453, 474, 462, 2.1, 1.9, 1.16; 709/206, 709/248; 715/223, 760, 780; 340/572.1, 340/568, 573.4, 539.32; 342/357.07
See application file for complete search history.

(56) References Cited

U.S. PATENT DOCUMENTS

| | | | |
|---|---|---|---|
| 2004/0141200 A1 | 7/2004 | Minami et al. | |
| 2005/0088302 A1* | 4/2005 | Pucci et al. | 340/568.1 |
| 2005/0141003 A1 | 6/2005 | Yamamoto et al. | |
| 2006/0176510 A1 | 8/2006 | Nishizawa | |
| 2006/0215228 A1 | 9/2006 | Inaba | |
| 2007/0058994 A1* | 3/2007 | Yaguchi | 399/17 |
| 2007/0253419 A1 | 11/2007 | Oshima | |
| 2008/0008318 A1 | 1/2008 | Kinoshita | |
| 2009/0309731 A1* | 12/2009 | Chan | 340/572.1 |
| 2010/0174974 A1* | 7/2010 | Brisebois et al. | 715/223 |
| 2010/0274859 A1* | 10/2010 | Bucuk | 709/206 |

FOREIGN PATENT DOCUMENTS

| | | |
|---|---|---|
| JP | H05-191544 A | 7/1993 |
| JP | H06-350766 A | 12/1994 |
| JP | 2004-222085 A | 8/2004 |
| JP | 2005-012701 A | 1/2005 |
| JP | 2005-197835 A | 7/2005 |
| JP | 2005-204177 A | 7/2005 |
| JP | 2005-295454 A | 10/2005 |
| JP | 2005-319672 A | 11/2005 |
| JP | 2005-348027 A | 12/2005 |
| JP | 2006-108854 A | 4/2006 |

(Continued)

OTHER PUBLICATIONS

Japan Patent Office; Notification of Reasons for Refusal in Japanese Patent Application No. 2008-020410 (counterpart to the above-captioned U.S. patent application) mailed Apr. 13, 2010.

(Continued)

*Primary Examiner* — Jerome Grant, II
(74) *Attorney, Agent, or Firm* — Baker Botts L.L.P.

(57) ABSTRACT

A communication apparatus is provided. The communication apparatus includes: a reading unit which reads original document data from a page of a transmission original document; a transmission unit which transmits original document data read by the reading unit to a designated destination; an acquisition unit which wirelessly acquires identification information capable of identifying a specific original document transmitted by the transmission unit in one communication from a wireless tag attached to each of a plurality of pages of a target original document; and an extraction unit which extracts the specific original document from the target original document based on the identification information acquired by the acquisition unit.

15 Claims, 15 Drawing Sheets

FOREIGN PATENT DOCUMENTS

| | | |
|---|---|---|
| JP | 2006-109365 A | 4/2006 |
| JP | 2006-157439 A | 6/2006 |
| JP | 2006-254058 A | 9/2006 |
| JP | 2007-067661 A | 3/2007 |
| JP | 2007-150573 A | 6/2007 |
| JP | 2007-235315 A | 9/2007 |

OTHER PUBLICATIONS

Japan Patent Office, Notification of Reasons for Refusal for Japanese Patent Application No. 2008-020409 (counterpart to above-captioned patent application), dispatched Apr. 13, 2010.

* cited by examiner

FIG. 11

EEPROM 627

IDENTIFICATION DATA

| DESTINATION DATA | FAX NUMBER : XXX-4567 |
|---|---|
| DATE-TIME DATA | DATE AND TIME : 2007/12/12/ 12:35 |
| PAGE NUMBER DATA | PAGE NUMBER : 1 |

FIG. 12

TRANSMISSION HISTORY STORAGE AREA 141

|   | DESTINATION DATA | DATE-TIME DATA | NUMBER-OF-SHEETS DATA |
|---|---|---|---|
| 1 | XXX-4567 | 2007/12/12  12:35 | 3 |
| 2 | YYY-1234 | 2007/12/11  14:26 | 1 |
| 3 | XXX-4567 | 2007/12/11  13:34 | 5 |
| 4 | ZZZ-9876 | 2007/12/10  15:30 | 4 |
| ⋮ | ⋮ | ⋮ | ⋮ |

SPECIFIC ORIGINAL DOCUMENT EXTRACTION CONDITION SETTING

TRANSMISSION HISTORY DESIGNATION

| FAX DESTINATION | DATE AND TIME | NUMBER OF SHEETS |
|---|---|---|
| XXX-4567 | 2007/12/12 12:35 | 3 |
| YYY-1234 | 2007/12/11 13:34 | 1 |
| XXX-4567 | 2007/12/11 14:26 | 5 |
| ZZZ-5678 | 2007/12/10 15:30 | 4 |

SPECIFIC ORIGINAL DOCUMENT EXTRACTION CONDITION SETTING

EXTRACTION CONDITION DESIGNATION

FAX DESTINATION : XXX-4567

DATE AND TIME DESIGNATION : START
END

OK

COMMUNICATION APPARATUS

CROSS-REFERENCE TO RELATED APPLICATION

This application claims priority from Japanese Patent Application No. 2008-020410, filed on Jan. 31, 2008, the entire subject matter of which is incorporated herein by reference.

TECHNICAL FIELD

Aspects of the present invention relate to a communication apparatus having a reading unit which reads original document data from an original document and a transmission unit which transmits the original document data to a desired destination, and more particularly, to a communication apparatus having acquisition unit which acquires data from a wireless tag attached to the original document.

BACKGROUND

A communication apparatus is configured to read original document data (that is, image data) from an original document and transmit the original document data to a user-desired destination. Recently, communication apparatuses utilizing a wireless tag have been considered to improve convenience in transmitting original document data.

Japanese Patent Application Publication No. 2005-348027 describes such a communication apparatus. The communication apparatus described in the publication utilizes a wireless tag attached to a business card or the like and improves convenience in facsimile transmission. Specifically, the communication apparatus acquires destination information (for example, information indicating a facsimile number) written in the wireless tag from the wireless tag attached to the business card or the like. The communication apparatus specifies a destination of facsimile transmission based on the acquired destination information and faxes original document data. That is, the communication apparatus simplifies user operation related to the destination of the facsimile transmission and improves convenience in the facsimile transmissions As described above, the communication apparatus described in JP-A-2005-348027 utilizes a wireless tag to "simplify a designation operation of a destination of facsimile transmission". However, in order to improve convenience related to facsimile transmission, a method for effectively utilizing a wireless tag, that is, information written to the wireless tag, is not limited to a manner as described in JP-A-2005-348027. That is, in a communication apparatus field, a method for effectively utilizing a wireless tag to improve convenience in facsimile transmission has not been sufficiently studied.

Here, when facsimile transmission is performed, an original document to be transmitted by a user can be mixed with other original documents. In this case, if the user does not search for an original document to be transmitted from large amount of original documents in which the original document to be transmitted is mixed with other original documents, desired facsimile transmission can not be performed. To search for the original document to be transmitted, the user has to scan content of each page of the large amount of original documents. That is, in this case, in a related-art communication apparatus including the communication apparatus described in JP-A-2005-348027, very complex work and burden are forced to the user and convenience is not sufficient.

Specifically, when an original document, which is facsimiled once, needs to be retransmitted by a facsimile, the above-described problem is apt to occur. In general, since once an original document is facsimiled, it is considered to be less essential and the user is apt to neglect the management of the original document. Then, the original document, which is required after facsimile transmission, is apt to be mixed with other documents (including other original documents) around the original document. Accordingly, in this case, the above-described problem is further remarkable.

In this regard, when the necessity of facsimile retransmission of an original document, which is once facsimiled, occurs, one solution method does exist. That is, when a previous facsimile transmission is performed, a communication apparatus stores original document data acquired at that time in a memory. When facsimile retransmission is required, the previously acquired original document data stored in the memory is transmitted. If this method is adopted, the above-described problem may be solved when the necessity of facsimile retransmission of an original document, which is once facsimiled, occurs. However, since a memory capacity of storing original document data is limited in this solution method, the above-described problem can not be solved.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a communication apparatus including an acquisition unit to acquire data from a wireless tag attached to an original document, more particularly, to provide a communication apparatus which utilizes data acquired from a wireless tag to improve convenience in extracting original documents to be handled as a set from among large amount of original documents.

According to an exemplary embodiment of the present invention, there is provided a communication apparatus including: a reading unit which reads original document data from a page of a transmission original document; a transmission unit which transmits original document data read by the reading unit to a designated destination; an acquisition unit which wirelessly acquires identification information capable of identifying a specific original document transmitted by the transmission unit in one communication from a wireless tag attached to each of a plurality of pages of a target original document; and an extraction unit which extracts the specific original document from the target original document based on the identification information acquired by the acquisition unit.

According to another exemplary embodiment of the present invention, there is provided a method for extracting an original document, the method including: reading first original document data from a first original document comprising a plurality of pages; transmitting the first original document data to a designated destination in one communication; wirelessly writing identification information to a wireless tag attached to each page of the first original document, the identification information comprising date-time information indicating date and time related to a transmission of the first original document data; storing the date-time information in a history storage unit; conveying a second original document comprising a plurality of pages; wirelessly acquiring identification information comprising date-time information from a wireless tag attached to each page of the conveyed second original document; determining whether a certain page of the second original document corresponds to a page of the first original document based on the date-time information acquired from the wireless tag of the certain page of the second original document and the date-time information stored in the history storage unit; and extracting the certain page from the second original document if it is determined that the certain page corresponds to a page of the first original document.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 11 is an illustrative view showing identification data written to the wireless tag;

FIG. 12 is an illustrative view showing transmission history data within a transmission history storage area;

FIG. 19 is an illustrative view showing a display example of an extraction condition designation screen.

DETAILED DESCRIPTION

Hereinafter, a communication apparatus according to an exemplary embodiment of the present invention will be described in detail with reference to the drawings. In the exemplary embodiment, the inventive concept of the present invention is applied to a facsimile apparatus.

Figure 1:
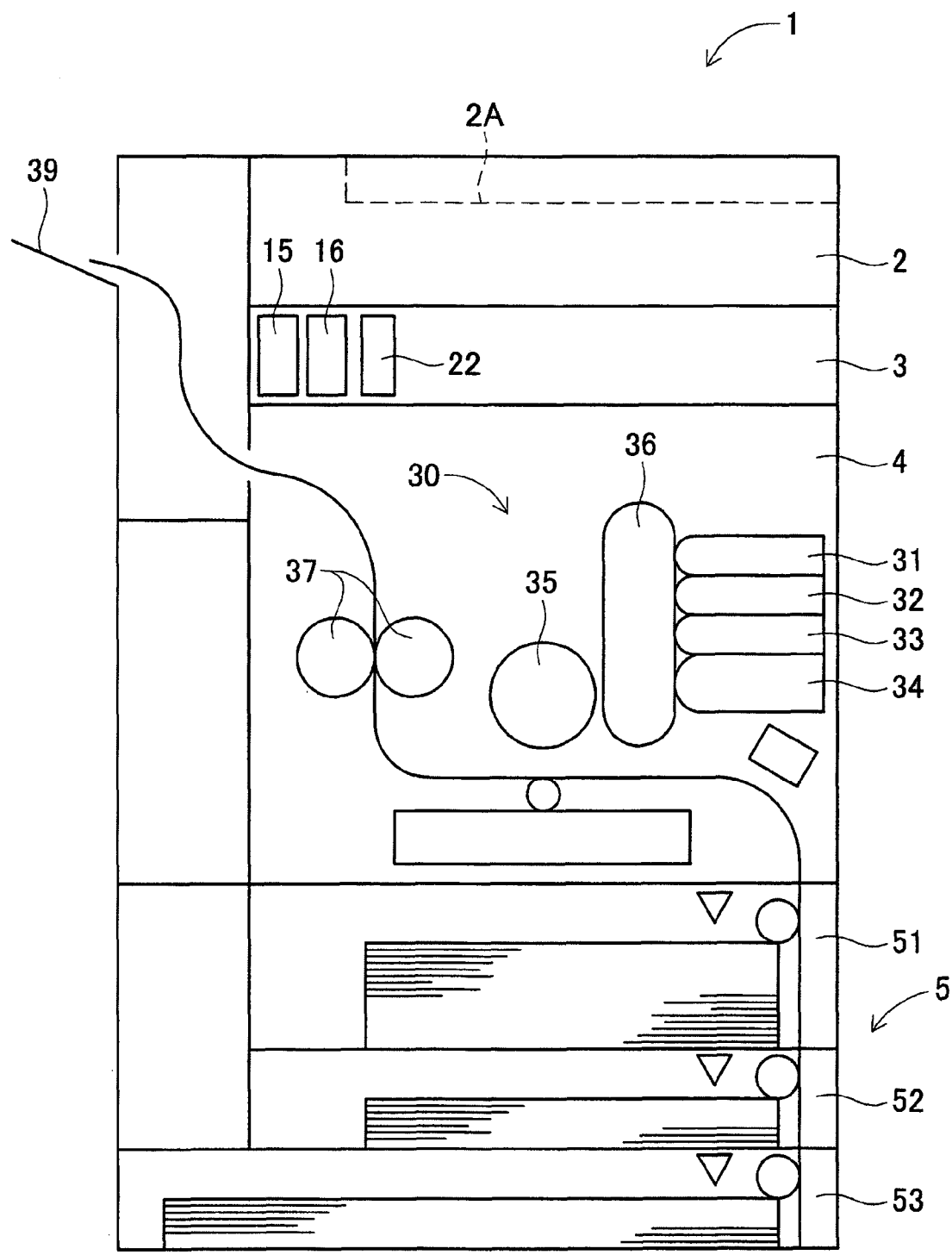
FIG. 1 is a schematic cross-sectional view of a facsimile apparatus according to an exemplary embodiment.

As shown in FIG. 1, the facsimile apparatus 1 includes an automatic original document feeder 2, a scanner unit 3, a printer unit 4, and a sheet-feeding tray unit 5.

The scanner unit 3 includes a wireless tag reader 15, a wireless tag writer 16, and a scanner 22. When a wireless tag 62 is attached to an original document fed by the automatic original document feeder 2 (for example, a transmission original document 61 (see FIG. 3), and the like), the wireless tag reader 15 wirelessly reads data (identification data to be described later, and the like) from the wireless tag 62. The wireless tag writer 16 wirelessly writes data (identification data to be described later, and the like) to the wireless tag 62 attached to the original document. The scanner 22 reads image data as original document data of an original document fed by the automatic original document feeder 2 regardless of the presence or absence of the wireless tag 62. Herein, the wireless tag refers to a recording medium, to which data is wirelessly writable, and from which data is wirelessly readable. Additionally, the wireless tag is also referred to as an IC tag or a radio frequency identification tag (RFID tag).

The printer unit 4 includes a laser printer 30. The laser printer 30 includes a Y station 31, an M station 32, a C station 33, and a K station 34. The Y station 31 contains yellow toner, the M station 32 contains magenta toner, the C station 33 contains cyan toner, and the K station 34 contains black toner. The laser printer 30 further includes fixing rollers 37 or an intermediate-transfer belt 36 for transferring toner of each station to a transfer drum 35. Any recording sheet to which the image is formed by the laser printer 30 is discharged to a sheet discharge stacker 39.

The sheet-feeding tray unit 5 includes a first sheet-feeding tray 51, a second sheet-feeding tray 52, and a third sheet-feeding tray 53. Each of the first to third sheet-feeding trays 51 to 53 includes a detection sensor 54. The detection sensor 54 detects whether the wireless tag is attached to the recording sheet accommodated in each of the first to third sheet-feeding trays 51 to 53.

Figure 2:
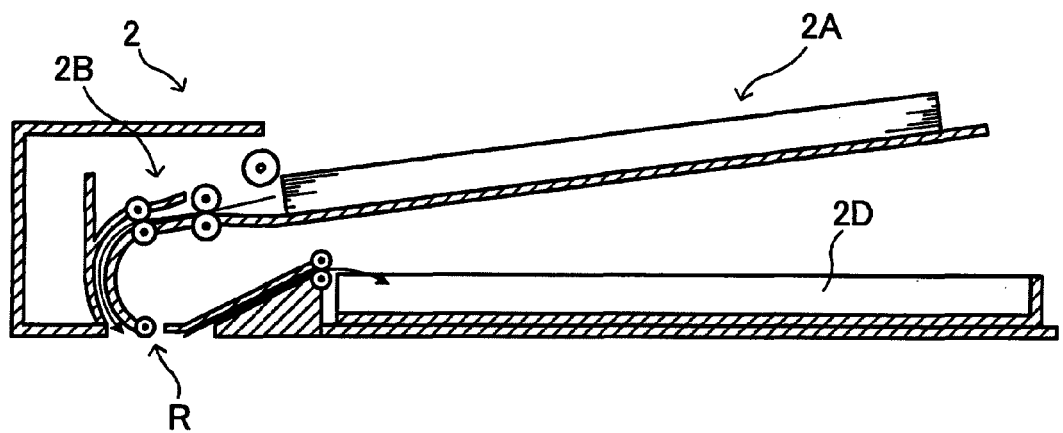
FIG. 2 is an illustrative view showing a configuration of an automatic original document feeder.
Figure 3:
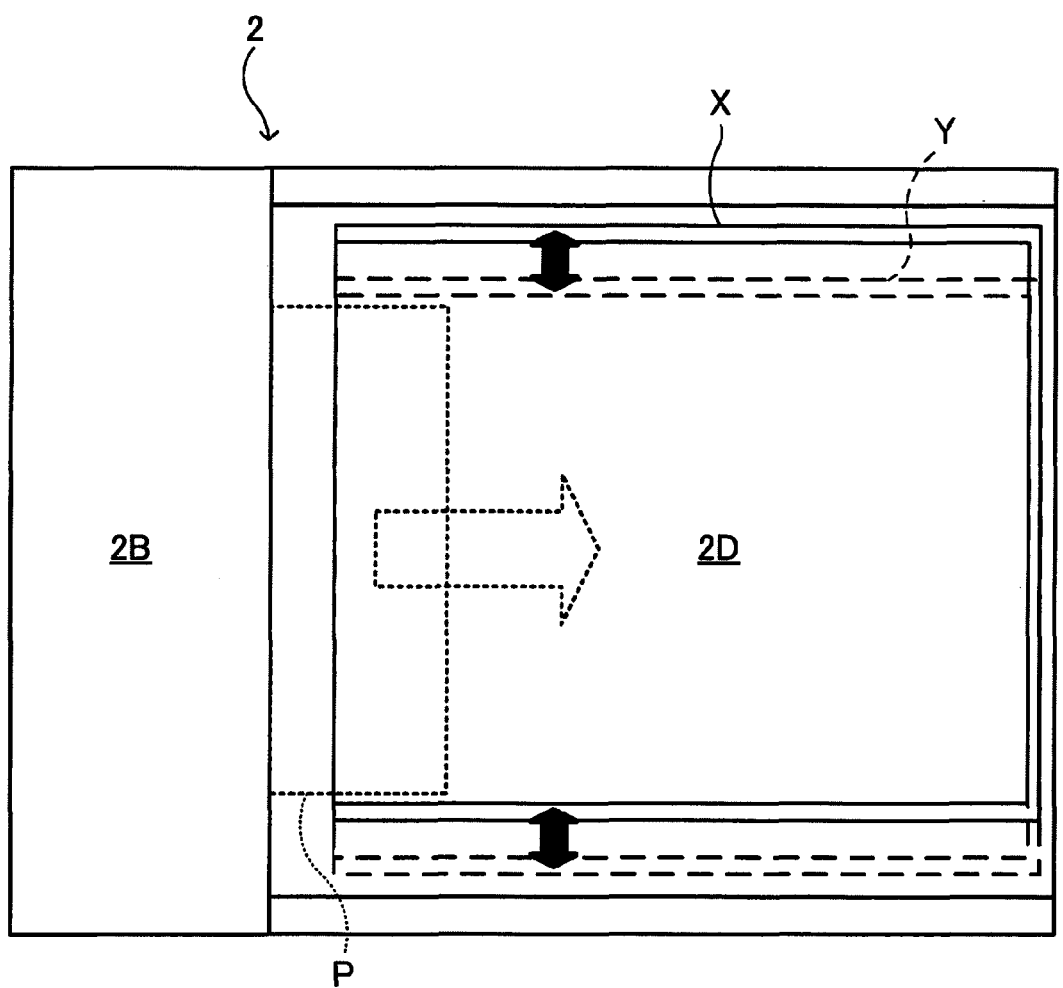
FIG. 3 is an illustrative view showing an original document discharge tray of the automatic original document feeder.

Here, a configuration of the automatic original document feeder 2 in the facsimile apparatus 1 will be described in detail with reference to the drawings. FIG. 2 is a cross-sectional view of the automatic original document feeder 2. FIG. 3 is an illustrative view showing an operation of an original document discharge tray 2D in the automatic original document feeder 2.

In the facsimile apparatus 1 according to this exemplary embodiment, the automatic original document feeder 2 includes an original document mounting unit 2A, an original document conveying mechanism 2B, a tray motor 2C (see FIG. 4), and an original document discharge tray 2D. The original document mounting unit 2A is a part on which original documents as a facsimile transmission target (transmission original documents 61, and the like to be described later) are mounted in a stacked state. On the original document mounting unit 2A, a target original document 70 (see FIG. 13) as an extraction target in a "set original document extraction mode" is also mounted.

The original document conveying mechanism 2B is a mechanism for discharging an uppermost original document of original documents stacked on the original document mounting unit 2A to the original document discharge tray 2D through an original document read position R. The original document conveying mechanism 2B is driven by a drive source (not shown). Drive control of the original document conveying mechanism 2B is performed based on a control signal from a CPU 11 to be described later. An original document conveyed by the original document conveying mechanism 2B is discharged from a predetermined original document discharge position P on the original document discharge tray 2D (see FIG. 3).

The original document discharge tray 2D is a tray to which an original document conveyed by the original document conveying mechanism 2B from the original document mounting unit 2A is discharged. The original document discharge tray 2D is arranged to be slidable in a predetermined range in the automatic original document feeder 2. Specifically, as shown in FIG. 3, the original document discharge tray 2D is arranged to perform a reciprocating motion between a first position X and a second position Y. The tray motor 2C is provided within the automatic original document feeder 2 and functions as a drive source for the reciprocating motion of the original document discharge tray 2D. The tray motor 2C undergoes drive control by a control signal from the CPU 11 to be described later. Accordingly, the original document tray 2D moves to the first potion X or the second position Y in response to a control signal from the CPU 11 (see FIG. 3).

Figure 4:
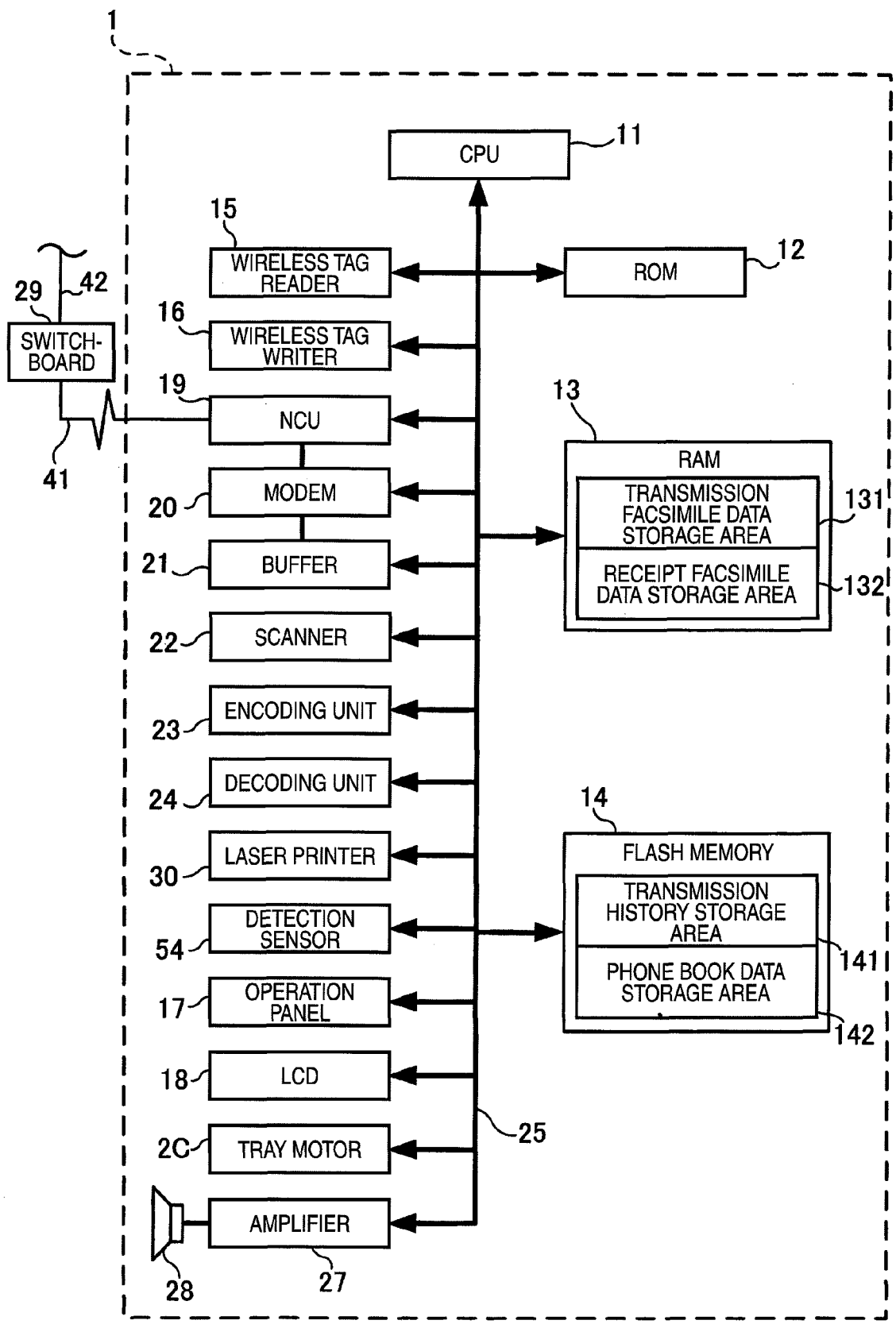
FIG. 4 is a block diagram showing a control system configuration of the facsimile apparatus.

Next, a control system configuration of the facsimile apparatus 1 according to this exemplary embodiment will be described in detail with reference to the drawings. FIG. 4 is a block diagram showing the control system configuration of the facsimile apparatus 1.

The facsimile apparatus 1 includes a central processing unit (CPU) 11, a read only memory (ROM) 12, a random access memory (RAM) 13, and a flash memory 14. Along with various peripherals of a network control unit (NCU) 19, and the like, these are connected to each other through a bus line 25.

The CPU 11 of the facsimile apparatus 1 performs a facsimile operation, that is, data communication, by controlling device components connected by the bus line 25 according to various signals transmitted and received through the NCU 19 to perform line control. The ROM 12 is a non-rewritable memory which stores control programs to be executed in the facsimile apparatus 1. The ROM 12 stores various control programs of a main control process program (see FIG. 8), a FAX transmission process program (see FIG. 10), a transmission history designating extraction process program (see FIG. 14), a extraction condition designating extraction process program (see FIG. 18), and the like to be described later.

The RAM 13 is a memory to temporarily store various data when the facsimile apparatus 1 is in operation. For example, the RAM 13 temporarily stores acquired identification data in a identification data acquisition process (S24) or a count result of the number of matches in a number-of-matches addition process (S26) in the transmission history designating extraction process program (see FIG. 14) to be described later.

The RAM 13 includes a transmission facsimile data storage area 131 and a receipt facsimile data storage area 132. The transmission facsimile data storage area 131 is a storage area in which original document data configured by image data of an original document acquired by the scanner 22 is stored. The receipt facsimile data storage area 132 is a storage area in which original document data received from another facsimile apparatus 1 (not shown) is stored temporarily.

The flash memory 14 is a rewritable nonvolatile memory. The flash memory 14 has a transmission history storage area 141 and a phone book data storage area 142.

The transmission history storage area 141 stores transmission history data indicating details related to facsimile transmission. In this exemplary embodiment, the transmission history data stored in the transmission history storage area 141 is configured by destination data, date-time data, and number-of-sheets data (see FIG. 12). Detailed content of the transmission history data will be described in detail later.

The phone book data storage area 142 is a storage area to store destination data capable of identifying a destination (for example, a destination device) of the facsimile transmission or call (for example, a phone number or facsimile number, and the like). In the facsimile apparatus 1, the user can make a call to the destination in facsimile transmission and in calling by using the destination data stored in the phone book data storage area 142.

As shown in FIG. 4, the facsimile apparatus 1 includes an NCU 19, a wireless tag reader 15, a wireless tag writer 16, a modem 20, a buffer 21, a scanner 22, an encoding unit 23, a decoding unit 26, a laser printer 30, a detection sensor 54, an operation panel 17, an LCD 18, an amplifier 27 and the tray motor 2C as peripherals. These peripherals are also connected to each other through the bus line 25.

As described above, the wireless tag reader 15 reads data (for example, identification data to be described later, and the like) stored in the wireless tag of an original document. The wireless tag writer 16 writes data (for example, identification data to be described later, and the like) to the wireless tag.

The NCU 19 performs a communication control process of a connection and disconnection of a line to a switchboard 29. The modem 20 modulates and demodulates original document data and to transmit and receive various sequence signals for transmission control. The buffer 21 temporarily stores data including encoded original document data in transmission to and receipt from a counterpart facsimile apparatus.

As described above, the scanner 22 configures a part of the scanner unit 3. The scanner 22 reads an original document fed on page-by-page basis from the original document mounting unit 2A and generates image data on page-by-page basis. The image data read by the scanner 22 configures original document data to be facsimiled later. The image data read by the scanner 22 is stored in the transmission facsimile data storage area 131.

The encoding unit 23 encodes original document data in facsimile transmission. The decoding unit 24 reads and decodes received data stored in the buffer 21.

As described above, the laser printer 30 prints image data decoded by the decoding unit 24 on a recording sheet stored in the first to third sheet-feeding trays 51 to 53.

The detection sensor 54 is a sensor that is provided to the first to third sheet-feeding trays 51 to 53 and detects the presence or absence of the wireless tag in a recording sheet stored in each sheet-feeding tray.

The operation panel 17 is an operation unit including a plurality of keys. Specifically, the operation panel 17 includes a plurality of numeric keys or cursor keys, a start key, and the like. When an operation to each key configuring the operation panel 17 is performed, an input signal is transmitted to the CPU 11 and control based on the input signal is performed. For example, the operation panel 17 is used when selecting and setting a facsimile transmission mode and a set original document extraction mode or when inputting a destination number (that is, a facsimile number) of facsimile transmission (S11) in facsimile transmission. Additionally, the operation panel 17 is used when selecting a transmission history (S22), based on which extraction is performed, in the transmission history designating extraction process program (see FIG. 14). Further, the operation panel 17 is used when inputting an extraction condition in an extraction condition designation process (S42) of an extraction condition designating extraction process program (see FIG. 18).

The LCD 18 is a display device configured with a liquid crystal display. Various display operations related to the facsimile apparatus 1 are performed on the LCD 18 under control of the CPU 11. For example, a FAX transmission history list screen (see FIG. 10) is displayed on the LCD 18 on the basis of storage content of the transmission history storage area 141. The LCD 18 displays an extraction mode setting screen (see FIG. 9), an extraction result notification screen (see FIG. 17), and an extraction condition designation screen (see FIG. 19).

A speaker 28 is connected to the amplifier 27 and a ringing tone is output from the speaker 28.

As described above, the tray motor 2C is a drive source for moving the original document discharge tray 2D between the first position X and the second position Y. The tray motor 2C is connected to the CPU 11 through the bus line 25. In the facsimile apparatus 1, the original document discharge tray 2D is moved between the first position X and the second position Y by driving the tray motor 2C under the control of the CPU 11.

The facsimile apparatus 1 is connected to the switchboard 29 through the NCU 19 and a telephone line 41. The switchboard 29 is connected to a switchboard (not shown) of a counterpart device through a telephone line 42 and further connected to a counterpart device (not shown) through a telephone line (not shown). Accordingly, the facsimile apparatus 1 can perform facsimile transmission of original document data to the counterpart device through the telephone line 41, the switchboard 29, the telephone line 42 and the like.

Figure 5:
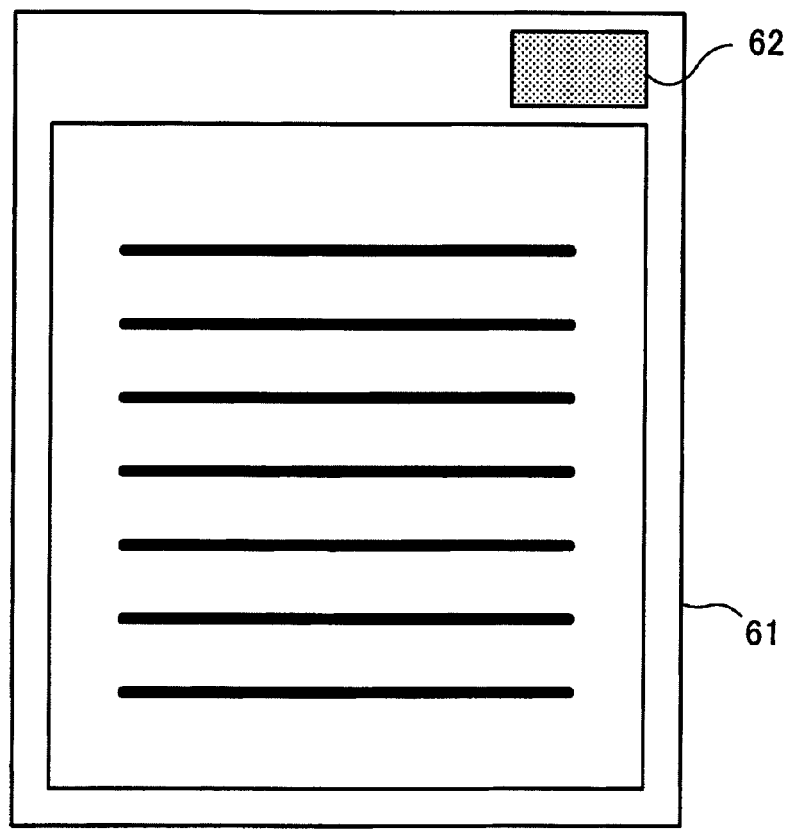
FIG. 5 is an illustrative view of a transmission original document used in the facsimile apparatus.

Next, a configuration of a transmission original document 61 used in the facsimile apparatus 1 according to this exemplary embodiment will be described in detail with reference to the drawings. FIG. 5 is an illustrative view showing a configuration of the transmission original document 61.

User-desired content as a facsimile transmission target is printed on the transmission original document 61 used in the facsimile apparatus 1 according to this exemplary embodiment. Accordingly, the facsimile apparatus 1 can generate original document data corresponding to the content of the transmission original document 61 by reading print content of the transmission original document 61 using the scanner 22.

A wireless tag 62 to be described later is attached to the transmission original document 61. When the transmission original document 61 is facsimiled based on a FAX transmission process program (see FIG. 10) to be described later, identification data to be described later is written to the wireless tag 62 attached to the transmission original document 61.

Next, an operation for the transmission original document 61 in facsimile transmission by the facsimile apparatus 1 will be described.

First, the user sets a transmission original document 61 on the original document mounting unit 2A and operates a start key (not shown) of the operation panel 17 to designate a condition of a destination, and the like. Herein, the number of sheets of the transmission original document 61 is not concerned. When the start key is input, the original document conveying mechanism 2B of the automatic original document feeder 2 conveys the transmission original document 61 set on the original document mounting unit 2A to the original document read position R of the scanner unit 3 on page-by-page basis.

Here, a data read position by the wireless tag reader 15 and a data write position by the wireless tag writer 16 are arranged on a movement path of the transmission original document 61, along which the transmission original document 61 moves relative to the scanner 22 of the scanner unit 3 (see FIG. 1). Accordingly, in a process in which the automatic original document feeder 2 conveys the transmission original document 61 to the read position of the scanner 22, the wireless tag writer 16 can write data (for example, identification data to be described later) to the wireless tag attached to the transmission original document 61. Similarly, in a process in which the transmission original document 61 is conveyed to the read position of the scanner 22, the wireless tag reader 15 can read data (for example, identification data to be described later) stored in the wireless tag 62 attached to the transmission original document 61.

As a result, in the facsimile apparatus 1, the wireless tag writer 16 can write data to the wireless tag 62 attached to the transmission original document 61 substantially simultaneously with reading image data of the transmission original document 61 by the scanner 22. Similarly, in the facsimile apparatus 1, the wireless tag reader 15 can read data from the wireless tag 62 in course of conveyance to the original document discharge tray 2D from the original document mounting unit 2A.

Next, configurations of the wireless tag 62, the wireless tag reader 15, and the wireless tag writer 16 according to this exemplary embodiment will be described in detail with reference to the drawings.

Figure 6:
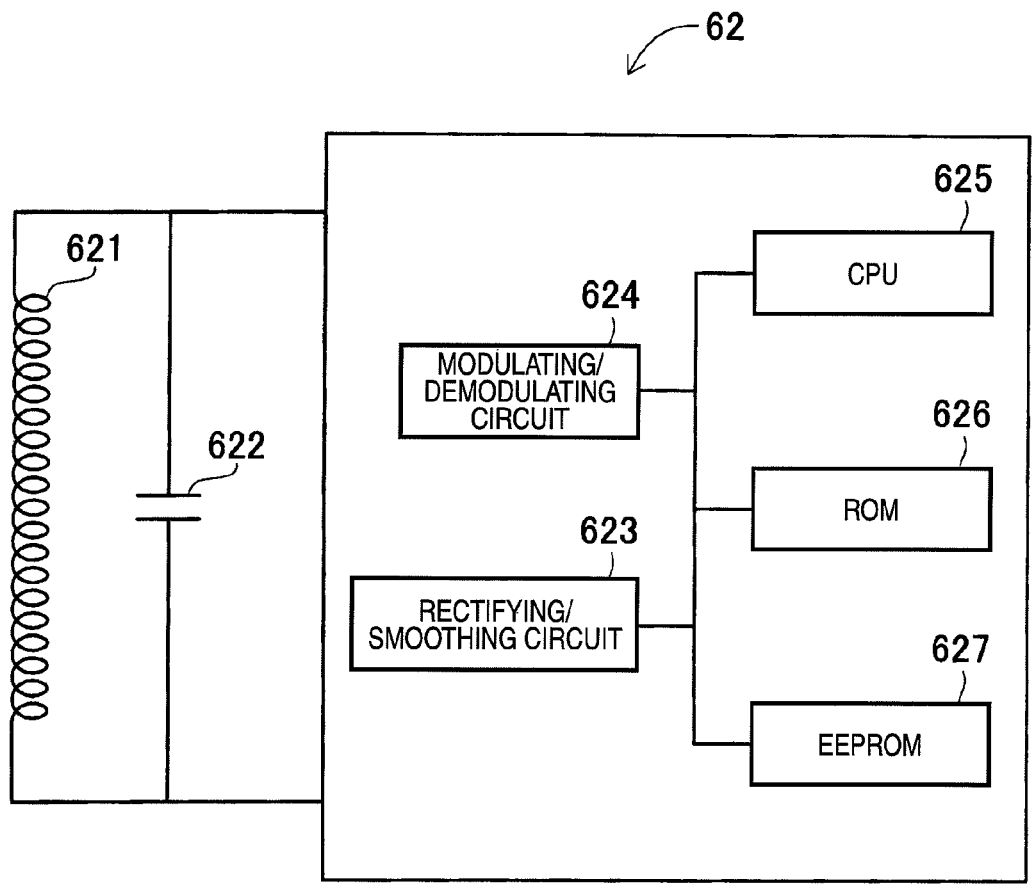
FIG. 6 is a block diagram showing a configuration of a wireless tag attached to the transmission original document.

First, the configuration of the wireless tag 62 will be described. As shown in FIG. 6, the wireless tag 62 includes an antenna coil 621, a resonance condenser 622, a rectifying and smoothing circuit 623, a modulating and demodulating circuit 624, a CPU 625, a ROM 626, and an EEPROM 627.

The antenna coil 621 configures a resonating circuit connected to the resonance condenser 622 in parallel and supplies a power radio wave signal to the rectifying and smoothing circuit 623 by receiving power radio wave vibration of a predetermined high frequency transmitted from the wireless tag reader 15 or the wireless tag writer 16.

The rectifying and smoothing circuit 623 is a circuit configuring a power supply circuit. The rectifying and smoothing circuit 623 supplies direct current power of a fixed voltage to the CPU 625 by rectifying and smoothing a power radio wave signal transmitted from the resonating circuit.

A transmission signal from the wireless tag reader 15 or the wireless tag writer 16 is transmitted by overlapping with the power radio wave signal. The transmission signal is demodulated by the modulating and demodulating circuit 624 and provided to the CPU 625.

The CPU 625 operates according to an operating program stored in the ROM 626 and executes a predetermined process in response to a signal from the modulating/demodulating circuit 624. That is, the CPU 625 executes a write process for writing received data (for example, identification data to be described later) to the EEPROM 627 or a read process for transmitting a radio wave signal by the antenna coil 621 after reading data (for example, identification data to be described later) stored in the EEPROM 627 and modulating the data by the modulating/demodulating circuit 624.

In the wireless tag 62, the rectifying and smoothing circuit 623, the modulating and demodulating circuit 624, the CPU 625, the ROM 626, and the EEPROM 627 are configured into an IC chip and embedded into a recording sheet along with the antenna coil 621 and the resonance condenser 622.

Next, configurations of the wireless tag reader 15 and the wireless tag writer 16 according to this exemplary embodiment will be described in detail with reference to the drawings.

Figure 7:
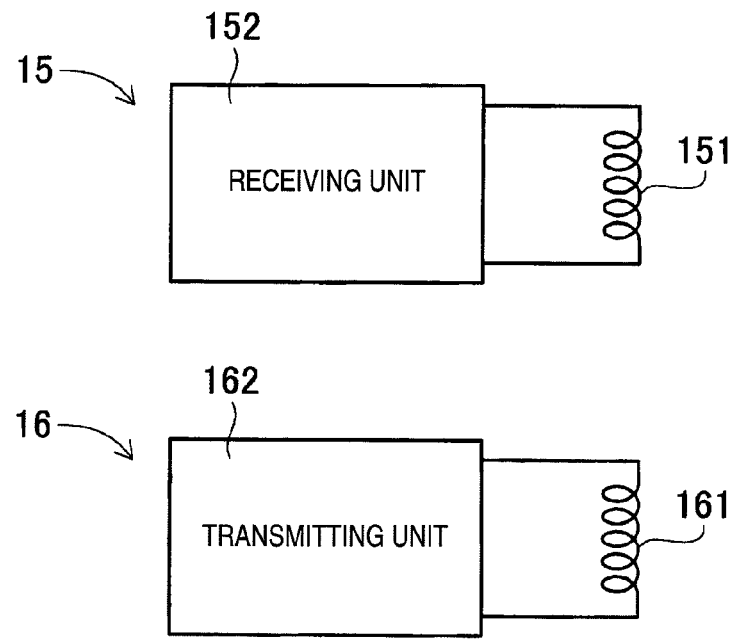
FIG. 7 is a block diagram showing configurations of a wireless tag reader and a wireless tag writer.

As shown in FIG. 7, the wireless tag reader 15 is configured with a receive antenna coil 151 and a receiving unit 152. The wireless tag reader 15 can receive a radio wave signal transmitted from the wireless tag 62 using the receive antenna coil

151. The wireless tag reader 15 demodulates the radio wave signal received by the receive antenna coil 151 using the receiving unit 152. Thereby, the wireless tag reader 15 can read data (for example, identification data) from the wireless tag 62.

The wireless tag writer 16 is configured with a transmit antenna coil 161 and a transmitting unit 162. The wireless tag writer 16 can modulate a carrier signal in the transmitting unit 162 and transmit a power radio wave signal from the transmit antenna coil 161. The wireless tag writer 16 can modulate data to be transmitted in the transmitting unit 162 such that the data overlaps with the power radio wave signal, thereby transmitting the signal from the transmit antenna coil 161. Thereby, the wireless tag writer 16 can write data (for example, identification data) to the wireless tag 62.

Figure 8:
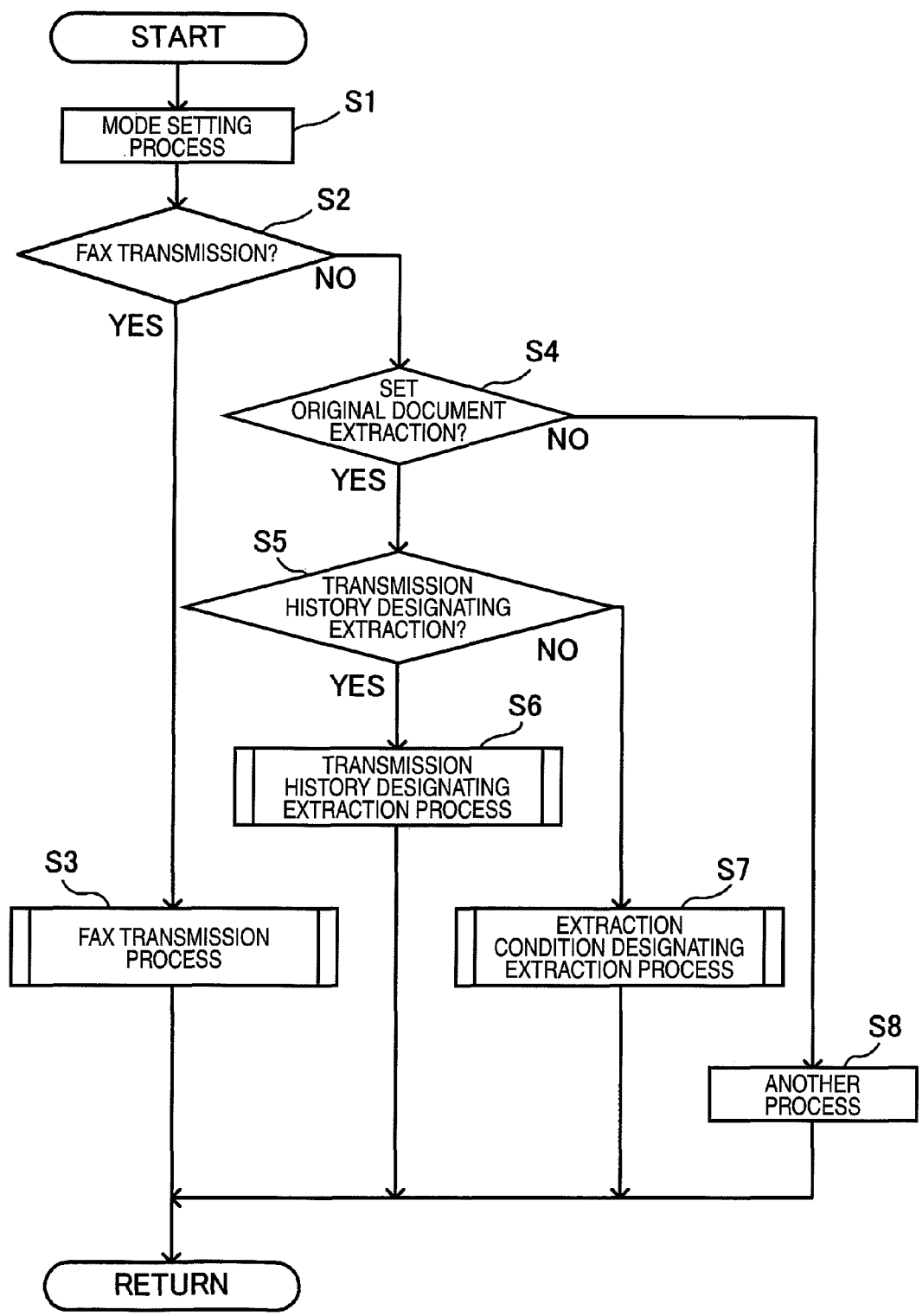
FIG. 8 is a flowchart of a main control program according to the exemplary embodiment.

Next, a main control program to be executed in the facsimile apparatus 1 according to this exemplary embodiment will be described in detail with reference to the drawings. FIG. 8 is a flowchart of the main control program according to this exemplary embodiment. A process based on the main control program is repeatedly executed in operation of the facsimile apparatus 1. In a description of the main control program, it is assumed that an original document is mounted on the original document mounting unit 2A of the facsimile apparatus 1. Here, the original document mounted on the original document mounting unit 2A becomes a facsimile transmission target and an extraction target of a target set original document to be described later.

When the main control program starts, a CPU 11 first executes a mode setting process S1. The mode setting process S1 is a process for allowing the user to arbitrarily select and set one function (mode) from various functions (modes) executable in the facsimile apparatus 1. Specifically, the CPU 11 first displays a mode setting screen (not shown) on the LCD 18. On the mode setting screen, options indicating various functions executable by the facsimile apparatus 1 are displayed. For example, an option "FAX transmission mode" related to a FAX transmission function and an option "set original document extraction mode" related to a set original document extraction function to be described later are displayed on the mode setting screen. The user operates an operation panel 17 while viewing the mode setting screen and selects a desired function in the facsimile apparatus 1. On the basis of the operation of the user using the operation panel 17, the CPU 11 stores a selection result of the user in the RAM 13 and ends the mode setting process. When the transmission mode setting process S1 ends, the CPU 11 shifts the process to S2.

In S2, the CPU 11 determines whether the option "FAX transmission mode" is selected in the mode setting process S1. Specifically, the CPU 11 performs the determination of S2 by referring to the selection result of the mode selection process S1 in the RAM 13. When the "FAX transmission mode" is selected (S2: YES), the CPU 11 shifts the process to S3. On the other hand, when the "FAX transmission mode" is not selected (S2: NO), the CPU 11 shifts the process to S4.

In S3, the CPU 11 executes a FAX transmission process. In the FAX transmission process S3, the CPU 11 executes a FAX transmission process program (see FIG. 10). In the FAX transmission process S3, the CPU 11 facsimiles original document data based on a transmission original document 61 mounted on the original document mounting unit 2A to a destination in one communication. The FAX transmission process S3 will be described in detail later with reference to the drawings. When the FAX transmission process S3 ends, the CPU 11 ends the main control program. In this case, the CPU 11 starts to execute the main control program again.

In this exemplary embodiment, the transmission original document 61 which is the base of original document data facsimiled by the FAX transmission process S3 in one communication and in which identification data is written to a wireless tag 62, is called a "set original document". As long as the "set original document" can be the transmission original document 61 facsimiled by the FAX transmission process S3 in one communication and in which the identification data is written to the wireless tag 62, the number of sheets of the transmission original document 61 is not concerned. That is, even the transmission original document 61 of one sheet can correspond to the "set original document".

In S4, the CPU 11 determines whether "set original document extraction mode" is selected in the mode setting process S1. Specifically, the CPU 11 performs the determination of S4 based on a selection result of the mode setting process S1 stored in the RAM 13. When the "set original document extraction mode" is selected and set (S4: YES), the CPU 11 shifts the process to S5. On the other hand, when the "set original document extraction mode" is not set (S4: NO), the CPU 11 shifts the process to S8.

Figure 9:
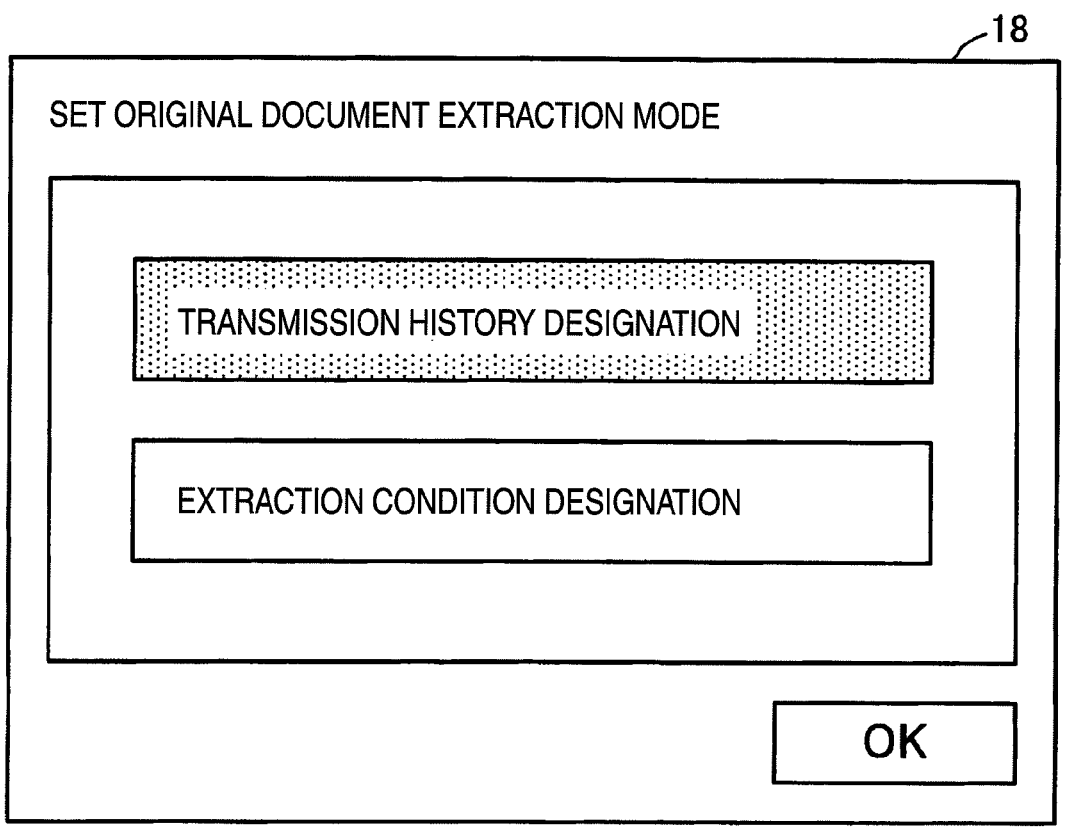
FIG. 9 is an illustrative view showing a display example of an extraction mode setting screen.

In S5, the CPU 11 determines whether "transmission history designation" is set as an extraction method of the "set original document extraction mode". Specifically, the CPU 11 displays an extraction mode setting screen (see FIG. 9) on the LCD 18 in S5. As shown in FIG. 9, the extraction mode setting screen includes two options including an option "transmission history designation" and an option "extraction condition designation". Accordingly, the user selects a desired option by an operation of the operation panel 17 while viewing the extraction mode setting screen. On the basis of the selection operation by the user, the CPU 11 stores a selection result in the extraction mode setting screen in the RAM 13. The CPU 11 refers to the RAM 13 and performs the determination of S5 based on the selection result in the extraction mode setting screen. When the option "transmission history designation" is selected and set (S5: YES), the CPU 11 shifts the process to a transmission history designating extraction process S6. On the other hand, the option "extraction condition designation" is selected and set (S5: NO), the CPU 11 shifts the process to an extraction condition designating extraction process S7.

In S6, the CPU 11 executes the transmission history designating extraction process. In the transmission history designating extraction process S6, the CPU 11 executes a transmission history designating extraction process program. That is, in the transmission history designating extraction process S6, the CPU 11 extracts transmission original documents 61 corresponding to the set original document previously transmitted in the FAX transmission process S3 from a target original document 70 including a large number of transmission original documents 61 based on conditions (for example, a destination or a date and time) corresponding to a transmission history designated by the user. When the transmission history designating extraction process S6 ends, the CPU 11 ends the main control program. In this case, the CPU 11 starts to execute the main control program again. The transmission history designating extraction process program will be described in detail later with reference to the drawings.

On the other hand, in S7, the CPU 11 executes the extraction condition designating extraction process. In the extraction condition designating extraction process S7, the CPU 11 executes an extraction condition designating extraction process program. That is, in the extraction condition designating extraction process S7, the CPU 11 extracts transmission original documents 61 corresponding to the set original document previously transmitted in the FAX transmission process S3 from the target original document 70 including a large number of transmission original documents 61 based on extraction conditions arbitrarily designated by the user. When the extraction condition designating extraction process S7 ends, the CPU 11 ends the main control program. In this case, the CPU 11 also executes the main control program again. The extraction condition designating extraction process program will be described in detail later with reference to the drawings.

When an option other than the "FAX transmission mode" and the "set original document extraction mode" is selected in the mode setting process S1 (S2: NO and S4: NO), the CPU 11 executes another process S8. In the other process S8, the CPU 11 executes various processes in response to setting content by the mode setting process S1. For example, when facsimile transmission is performed in the FAX transmission process S3, the CPU 11 performs a process for setting whether to write identification data to the wireless tag 62 of the transmission original document 61 as the other process S8. The user can arbitrarily set the setting content. The setting content is stored in the flash memory 14. When the other process S8 ends, the CPU 11 ends the main control program. In this case, the CPU 11 also executes the main control program again.

Figure 10:
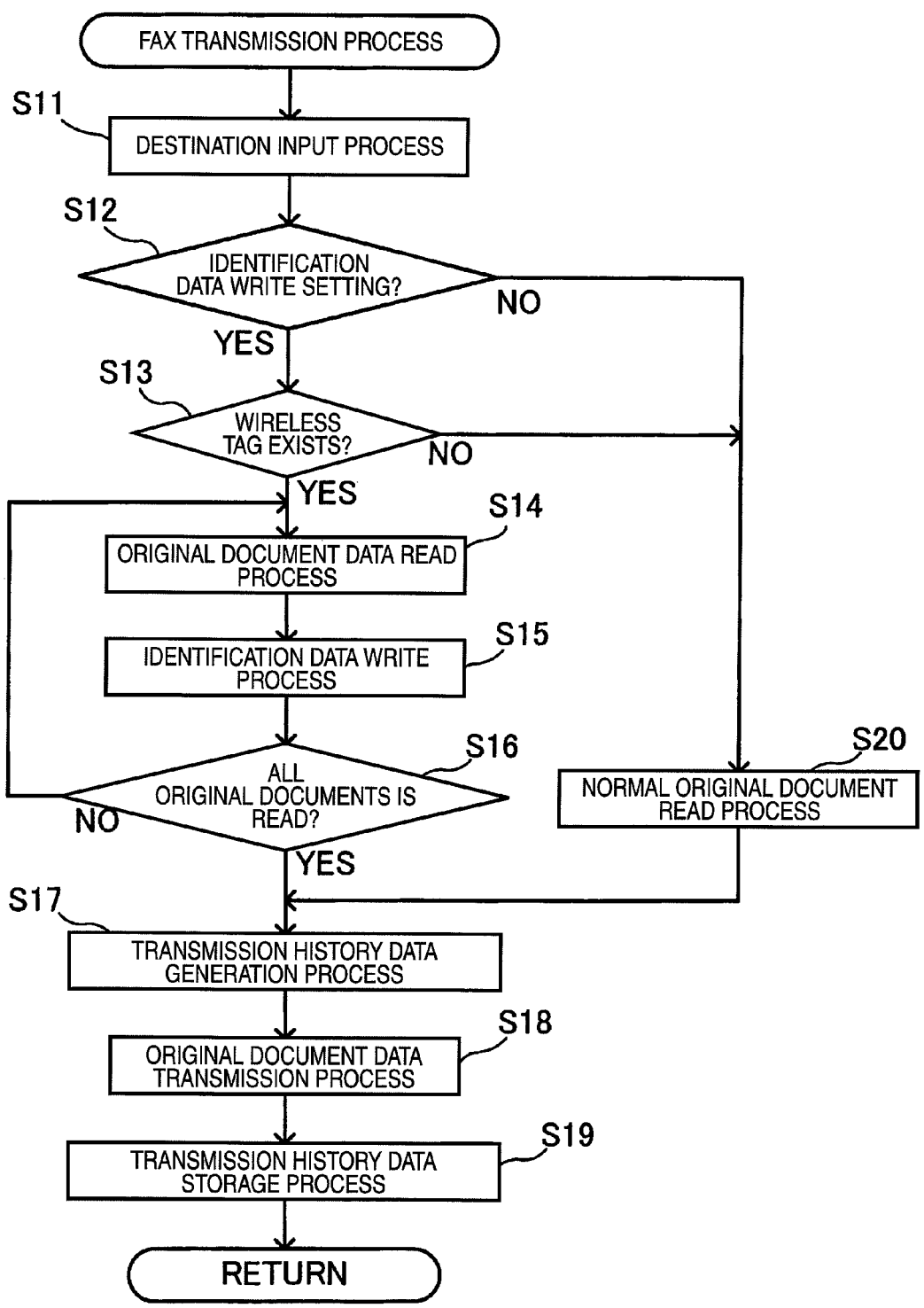
FIG. 10 is a flowchart of a FAX transmission process program.

Next, the FAX transmission process program according to this exemplary embodiment will be described in detail with reference to the drawings. FIG. 10 is a flowchart of the FAX transmission process program. As described above, the FAX transmission process program is executed by the CPU 11 in the FAX transmission process S3.

In the FAX transmission process S3, the CPU 11 first executes a destination input process S11. In the destination input process S11, the user operates the operation panel 17 and inputs a destination (for example, a facsimile number) of the transmission original document 61 mounted on the original document mounting unit 2A. The CPU 11 stores destination data based on an input signal from the operation panel 17 in the RAM 13. After the destination data is stored in the RAM 13, the CPU 11 shifts the process to S12.

In S12, the CPU 11 determines whether identification data write setting is valid at present. The "identification data write setting" is a setting item related to whether to write identification data to be described later to the wireless tag 62 attached to the transmission original document 61 when the facsimile transmission based on the transmission original document 61 is performed. The CPU 11 performs the determination of S12 based on the setting content stored in the flash memory 14 in the other process S8. When the identification data write setting is valid (S12: YES), the CPU 11 shifts the process to S13. On the other hand, when the identification data write setting is invalid (S12: NO), the CPU 11 shifts the process to a normal original document read process S20.

In S13, the CPU 11 determines whether the wireless tag 62 is attached to the original document mounted on the original document mounting unit 2A. That is, the CPU 11 determines whether the transmission original document 61 with the wireless tag 62 is mounted on the original document mounting unit 2A. In determining whether the wireless tag 62 is attached, for example, a first sheet of the original document is conveyed to the vicinity of the wireless tag reader 15 and the presence or absence of the wireless tag 62 can be determined by a detection result from the wireless tag reader 15. When the transmission original document 61 with the wireless tag 62 is mounted on the original document mounting unit 2A (S13: YES), the CPU 11 shifts the process to S14. On the other hand, when an original document without the wireless tag 62 is mounted on the original document mounting unit 2A (S13: NO), the CPU 11 shifts the process to the normal original document read process S20.

In S14, the CPU 11 executes an original document data read process. In the original document data read process S14, the CPU 11 reads the transmission original document 61 of one page from the transmission original document 61 mounted on the original document mounting unit 2A using the scanner unit 3. The CPU 11 stores read image data as original document data of one page in a transmission facsimile data storage area 131. After the original document data of one page is stored in the transmission facsimile data storage area 131, the CPU 11 shifts the process to S15. When the original document data read process S14 for a first page of the transmission original document 61 mounted on the original document mounting unit 2A is executed, the CPU 11 stores a read date and time of the transmission original document 61 of the first page as date-time data in the RAM 13.

In S15, the CPU 11 executes an identification data write process. In this identification data write process S15, the CPU 11 writes identification data to the wireless tag 62 attached to the transmission original document 61 of one page read in the original document data read process S14 using the wireless tag writer 16. After the identification data is written to the wireless tag 62 of the transmission original document 61, the CPU 11 shifts the process to S16.

Here, the identification data written to the wireless tag 62 in the identification data write process S15 will be described with reference to the drawings.

As shown in FIG. 11, the identification data is configured by destination data, date-time data, and page number data. The identification data is capable of identifying a specific original document facsimiled in one communication and may indicate an unique attribute of the specific original document. The destination data indicates a transmission destination of facsimile transmission based on the transmission original document 61. The destination data is generated based on content input in the destination input process S11 and stored in the RAM 13. For example, data indicating a facsimile number input in the destination input process S11 corresponds to the destination data (see FIG. 11).

The date-time data indicates a date and time of a process related to the facsimile transmission based on the transmission original document 61. The date-time data of this exemplary embodiment indicates a date and time of reading the original document data based on a first page of the transmission original document 61 in the facsimile transmission like "2007/12/12 12:35" (see FIG. 11). As described above, the date-time data has been stored in the RAM 13 in the original document data read process S14.

The page number data indicates a sequence in which one page of the transmission original document 61 as a present target is transmitted to the destination in the facsimile transmission based on the transmission original document 61. In this regard, in the FAX transmission process S3, the CPU 11 transmits the original document data from the transmission original document 61 to a predetermined transmission destination in a read sequence. Accordingly, the page number data is also associated with a sequence in which the scanner unit 3 reads the one page. For example, in facsimile transmission, page number data of a first read transmission original document 61 indicates "page number: 1" (see FIG. 11). When multiple sheets of transmission original documents 61 are mounted on the original document mounting unit 2A, a number indicating the page number data is sequentially incremented by 1 whenever the process (S14 and S15) for the transmission original document 61 of one page ends.

That is, when the original document data related to the one page of the transmission original document 61 is stored in the transmission facsimile data storage area 131 by the original document data read process S14, the CPU 11 writes each data based on storage content of the RAM 13 as identification data to the wireless tag 62 of the transmission original document 61 (S15). Specifically, the CPU 11 writes the destination data, the date-time data, and the page number data stored in the RAM 13 as the identification data to an EEPROM 627 of the wireless tag 62 in the transmission original document 61 using the wireless tag writer 16. The destination data, the date-time data, and the page number data written as the identification data in the wireless tag 62 configure identification detail data, respectively. Here, when multiple transmission original documents 61 exist, the destination data and the date-time data among the identification data written to the wireless tag 62 are common among the identification data of all the transmission original documents 61 and only the page number data is updated according to a page sequence.

In S16, the CPU 11 determines whether the process (S14 and S15) for all transmission original documents 61 mounted on the original document mounting unit 2A is completed. Specifically, the CPU 11 determines whether the transmission original document 61 exists on the original document mounting unit 2A. When the process (S14 and S15) for all the transmission original documents 61 is completed (S16: YES), the CPU 11 shifts the process to S17. On the other hand, when the process for all the transmission original documents 61 is not completed (S16: NO), the CPU 11 returns the process to S14. In this case, the CPU 11 starts the process (S14 and S15) for the next transmission original document 61 present on the original document mounting unit 2A.

In S17, the CPU 11 executes a transmission history data generation process. In this transmission history data generation process S17, the CPU 11 generates transmission history data related to the facsimile transmission of the transmission original document 61. Specifically, the CPU 11 generates transmission history data based on the destination data, the date-time data, etc. stored in the RAM 13. After the generated transmission history data is stored in the RAM 13, the CPU 11 shifts the process to S18.

Here, the transmission history data is configured by destination data, date-time data, and number-of-sheets data (see FIG. 12). The destination data and the date-time data configuring the transmission history data indicate the same content as the destination data and the date-time data of the identification data written to the wireless tag 62 of the transmission original document 61 in the identification data write process S15. The number-of-sheets data indicates the number of sheets of transmission original documents 61 to be transmitted in the facsimile transmission. Specifically, a numerical value indicating the page number data when the process is shifted to S17 corresponds to a value of number-of-sheets data. Accordingly, the CPU 11 generates the transmission history data related to the facsimile transmission based on the destination data and the date-time data stored in the RAM 13 and the number-of-sheets data based on the page number data when the process is shifted to S17. The destination data, the date-time data, and the number-of-sheets data configuring the transmission history data configure history detail data indicating details of the transmission history data, respectively.

When the facsimile transmission is performed by the normal original document transmission read process S20, the CPU 11 also generates transmission history data. The transmission history data of this case is also configured by destination data, date-time data, and number-of-sheets data. The destination data of this case is based on input content of the destination input process S11 as in the above-described case. The date-time data of this case indicates a read date and time of a first page of an original document as a facsimile transmission target. The number-of-sheets data of this case indicates the total number of original document sheets as a facsimile transmission target.

In S18, the CPU 11 executes an original document data transmission process. In the original document data transmission process S18, the CPU 11 facsimiles original document data within the transmission facsimile data storage area 131 to a destination designated in the destination input process S11. Here, the original document data to be transmitted is image data based on all transmission original documents 61 read by the process S14 or image data based on all original documents read by the normal original document read process. The original document data is facsimiled to the destination in one communication. When the original document data transmission process S18 ends, the CPU 11 shifts the process to S19.

In S19, the CPU 11 executes a transmission history data storage process. In this transmission history data storage process S19, the CPU 11 stores transmission history data generated by the transmission history data generation process S17 in the transmission history storage area 141. The CPU 11 reads the transmission history data generated by the transmission history data generation process S17 from the RAM 13 and stores the transmission history data in the transmission history storage area 141 at every facsimile transmission (see FIG. 12). After the transmission history data is stored in the transmission history storage area 141, the CPU 11 ends the FAX transmission process program.

Here, when "identification data write setting" is invalid (S12: NO) or when the transmission original document 61 attached with the wireless tag 62 is not mounted on the original document mounting unit 2A (S13: NO), the CPU 11 executes the normal original document read process S20. In the normal original document read process S20, the CPU 11 reads image data on a page-by-page basis by setting all original documents mounted on the original document mounting unit 2A to a target. The CPU 11 stores the image data as the original document data in the transmission facsimile data storage area 131. That is, in the normal original document read process S20, a write operation to the wireless tag 62 is not performed. At this time, the CPU 11 stores the date-time data and the number-of-sheets data in the RAM 13. Since this storage process is the same as in the above-described case, its description is omitted. When the original document data based on all the original documents on the original document mounting unit 2A is stored in the transmission facsimile data storage area 131, the CPU 11 shifts the process to S17.

In this exemplary embodiment, the content of the transmission history data stored in the transmission history storage area 141 can be referred to by a FAX transmission history list screen displayed on the LCD 18.

The transmission original document 61 transmitted by the FAX transmission process program in one transmission through S14 and S15 configures one set original document. At least the date-time data in the identification data is different between the set original document and a set original document transmitted in one communication through S14 and S15 at another time. Accordingly, even when multiple set original documents are mixed, a transmission original document 61 including both the set original documents can be discriminated by referring to the identification data written to the wireless tag 62.

Figure 13:
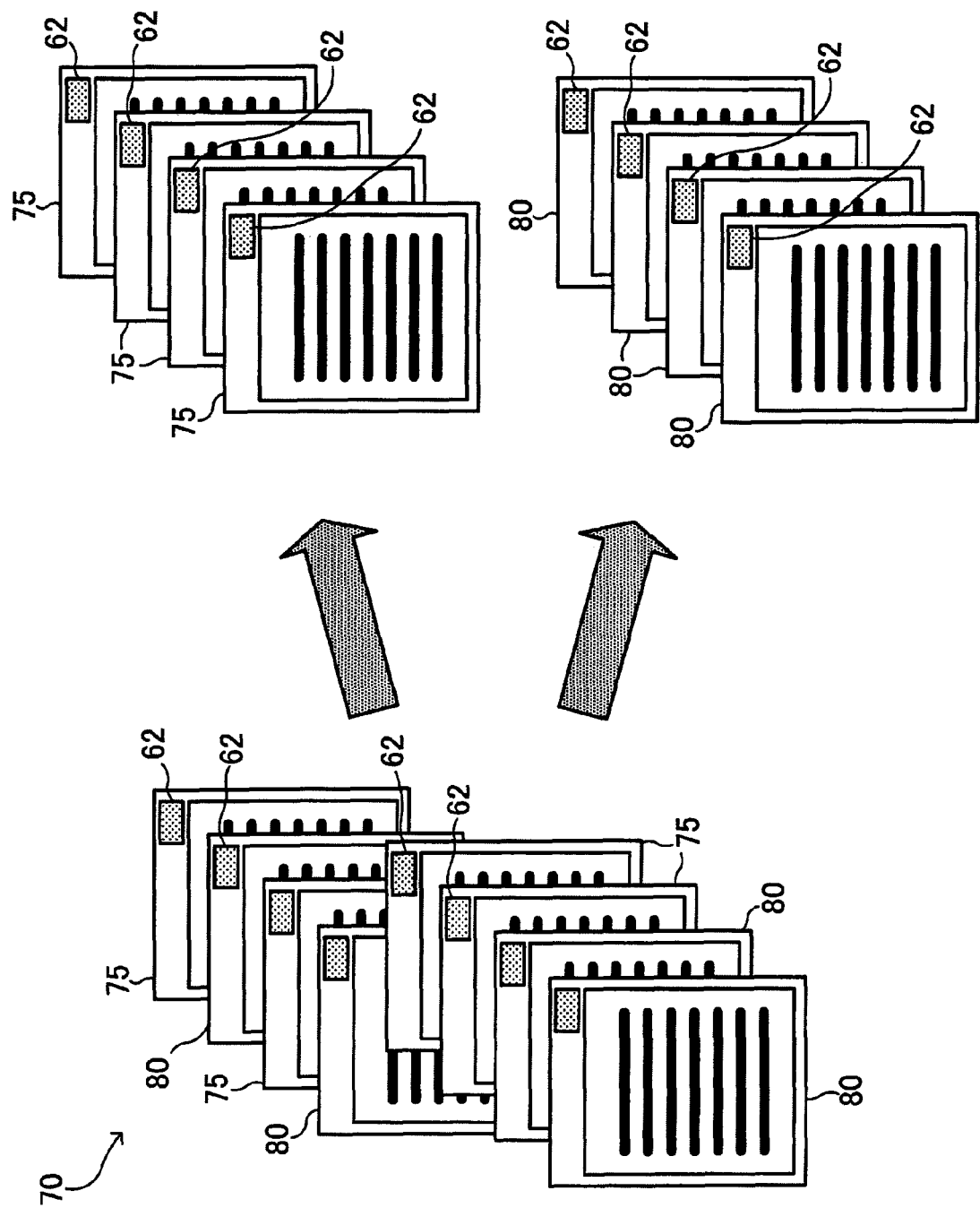
FIG. 13 is an illustrative view showing an outline of a set original document extraction mode.

Here, the "set original document extraction mode" in the facsimile apparatus 1 according to this exemplary embodiment will be described. FIG. 13 is an illustrative view conceptually showing the set original document extraction mode.

As shown in FIG. 13, a target original document 70 as a target of the "set original document extraction mode" includes a target set original document 75 and a non-target set original document 80. Here, the target set original document 75 indicates a user desired set original document. On the other hand, the non-target set original document 80 indicates an original document other than the target original document 75 included in the target original document 70.

That is, the "set original document extraction mode" is a mode in which the facsimile apparatus 1 extracts the user desired target set original document 75 from among the target original document 70 including large amount of original documents. The facsimile apparatus 1 extracts the target set original document 75 from the target original document 70 on the basis of user designated extraction conditions and the identification data stored in the wireless tag 62 of the target set original document 75. Extraction condition is designated by the user through the transmission history data (S6) or by setting detailed extraction conditions (S7).

Thereby, the facsimile apparatus 1 can provide the user with convenience that the user desired target set original document 75 can be selected from the target original document 70 including large amount of original documents.

Figure 14:
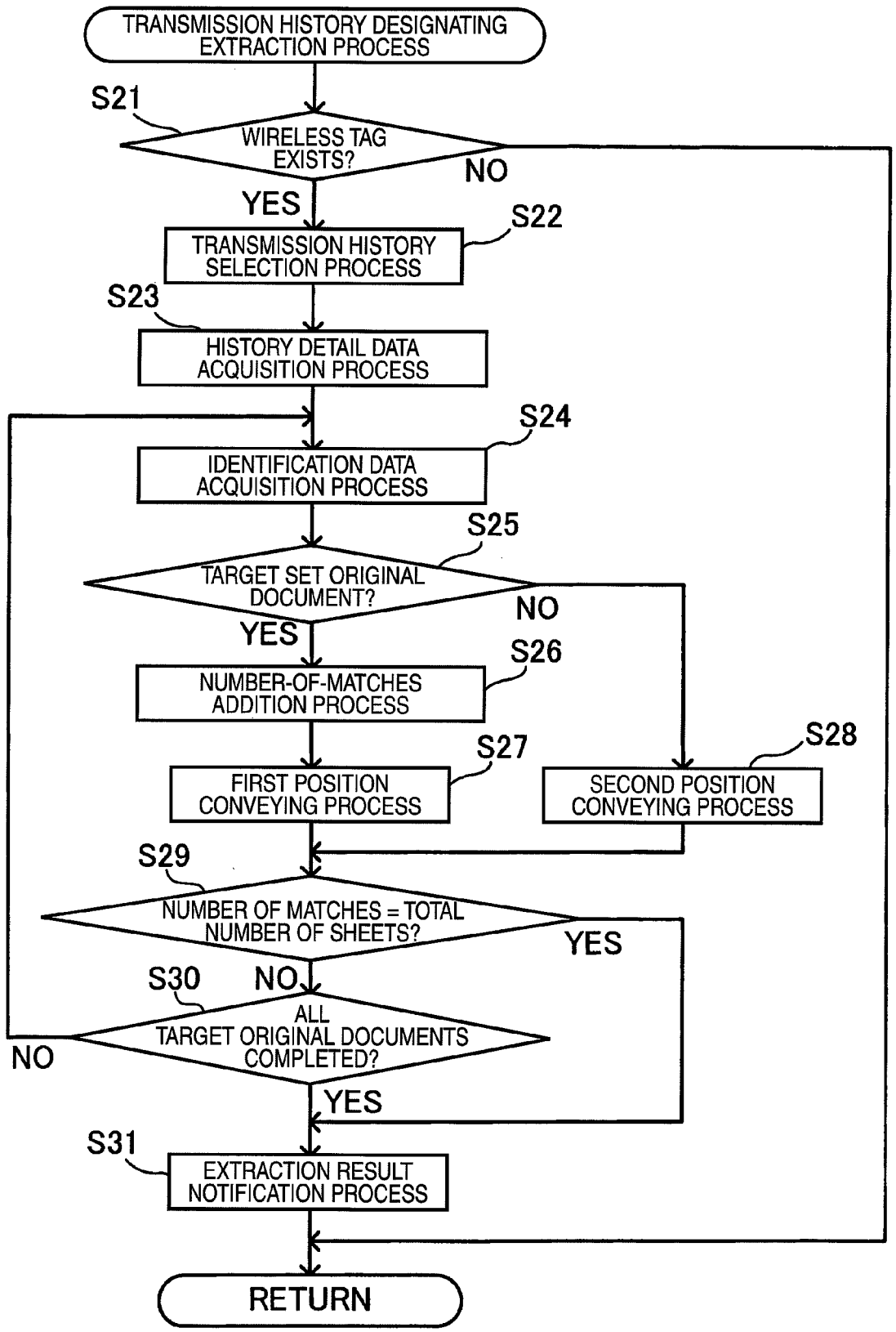
FIG. 14 is a flowchart of a transmission history designating extraction process program.

Subsequently, a transmission history designating extraction process program according to this exemplary embodiment will be described in detail with reference to the drawings. FIG. 14 is a flowchart of the transmission history designating extraction process program. As described above, the transmission history designating extraction process program is executed by the CPU 11 in the transmission history designating extraction process S6.

In a description of the transmission history designating extraction process S6, the target original document 70 configured with a plurality of original document sheets including the target set original document 75 are mounted on the original document mounting unit 2A as shown in FIG. 13.

In the transmission history designating extraction process S6, the CPU 11 first determines whether an original document (that is, a transmission original document 61) to which the wireless tag 62 is attached is included in the target original document 70 mounted on the original document mounting unit 2A (S21). When the original document with the wireless tag 62 is included in the target original document 70 (S21: YES), the CPU 11 shifts the process to S22. When the original document with the wireless tag 62 is not included in the target original document 70 (S21: NO), the CPU 11 ends the transmission history designating extraction process program. As described above, in determining whether the wireless tag 62 is attached, for example, a first sheet of an original document is conveyed to the vicinity of the wireless tag reader 15 and the presence or absence of the wireless tag 62 can be determined by a detection result from the wireless tag reader 15. It is noted that a wireless tag reader (not shown) for identifying the presence or absence of the wireless tag 62 may be provided to the original document mounting unit 2A to identifying the presence or absence of the wireless tag 62 when the target original document 70 is set on the original document mounting unit 2A.

Figures 15, 16:
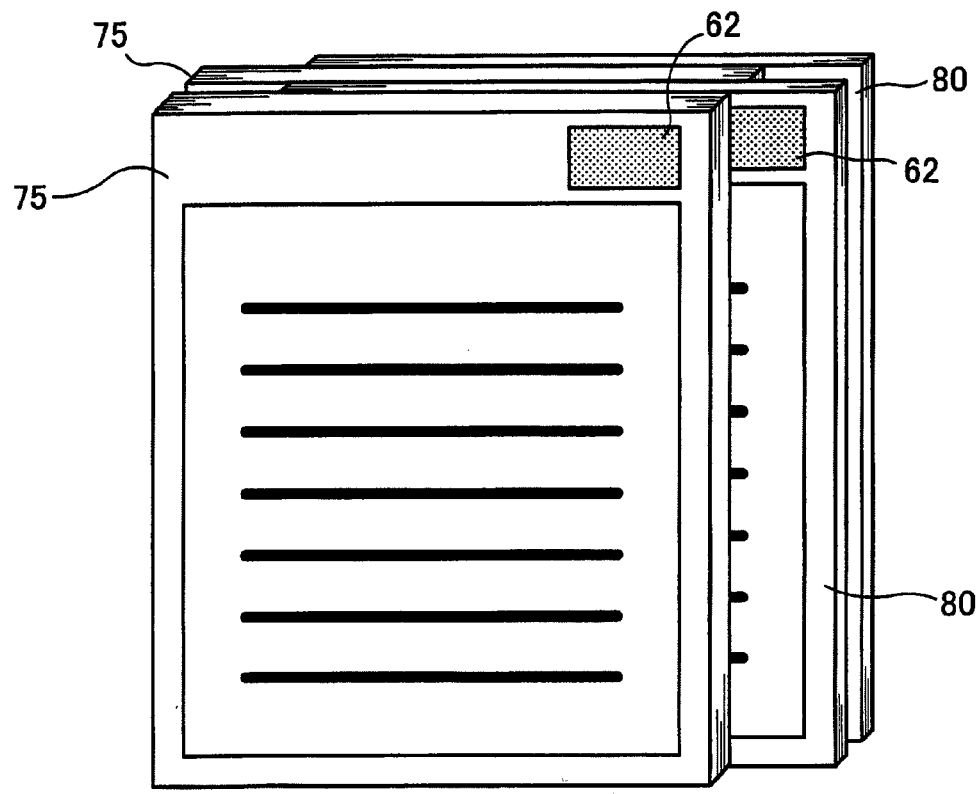
FIG. 15 is an illustrative view showing a display example of a transmission history designation screen.
FIG. 16 is an illustrative view showing a target original document discharged to an original document discharge tray after an extraction process ends.

In S22, the CPU 11 executes a transmission history selection process. In the transmission history selection process S22, the CPU 11 first displays a transmission history designation screen (see FIG. 15) on the LCD 18. As shown in FIG. 15, the transmission history designation screen displays content of each transmission history data stored in the transmission history storage area 141 in a list. Accordingly, the user can select a desired transmission history by an operation of the operation panel 17 while viewing the transmission history designation screen. The CPU 11 specifies the transmission history (that is, transmission history data) selected by the user in response to an operation signal from the operation panel 17. When the transmission history selection process S22 ends, the CPU 11 shifts the process to S23.

In S23, the CPU 11 executes a history detail data acquisition process. In the history detail data acquisition process S23, the CPU 11 acquires history detail data of the transmission history data specified in the transmission history selection process S22. The CPU 11 stores the acquired history detail data, that is, destination data, date-time data, and number-of-sheets data as extraction conditions in the RAM 13. When history detail data configuring user desired transmission history data is stored as the extraction conditions in the RAM 13, the CPU 11 shifts the process to S24.

The facsimile apparatus 1 according to this exemplary embodiment can set the extraction conditions related to a user desired transmission history using the transmission history data by executing the transmission history selection process S22 and the history detail data acquisition process S23 as described above. In this case, a set original document corresponding to the user desired transmission history corresponds to the target set original document 75 in FIG. 13.

In S24, the CPU 11 executes an identification data acquisition process. In this identification data acquisition process S24, the CPU 11 first conveys an original document of one page from the target original document 70 mounted on the original document mounting unit 2A to an original document discharge tray 2D. The CPU 11 acquires identification data from the wireless tag 62 of the original document conveyed from the original document mounting unit 2A using the wireless tag reader 15. After the acquired identification data is stored in the RAM 13, the CPU 11 shifts the process to S25.

In S25, the CPU 11 determines whether the original document of one page conveyed in the identification data acquisition process S24 corresponds to the target set original document 75. Specifically, the CPU 11 performs the determination of S25 based on the identification detail data acquired from the wireless tag 62 of the original document and the history detail data set in the RAM 13 as the extraction conditions. When the destination data and the date-time data of the identification detail data are the same as those of the history detail data related to the extraction conditions, the CPU 11 determines that the original document corresponds to the target set original document 75. On the other hand, when the destination data or the date-time data is different between the identification detail data and the history detail data, the CPU 11 determines that the original document is not the target set original document 75 (that is, a non-target set original document 80). When the original document corresponds to the target set original document 75 (S25: YES), the CPU 11 shifts the process to S26. When the original document corresponds to the non-target set original document 80 (S25: NO), the CPU 11 shifts the process to S28. At this time, the CPU 11 deletes the identification data acquired from the original document as the non-target set original document from the RAM 13. Accordingly, in S25, only the identification data acquired from the original document determined as the target set original document 75 is stored (retained) in the RAM 13.

In S26, the CPU 11 executes a number-of-matches addition process. In the number-of-matches addition process, the CPU 11 adds "1" to a value of a number-of-matches counter indicating the number of times identification detail data of an original document to be processed matches the history detail data set as the extraction conditions. That is, the number of matches indicates the number of original document sheets extracted from the target original document 70 as the target set original document 75. The number-of-matches counter is formed as one storage region in the RAM 13. After "1" is added to the value of the number-of-matches counter, the CPU 11 ends the number-of-matches addition process S26 and shifts the process to S27.

The number-of-matches addition process S26 ends before an original document starting to be conveyed in the identification data acquisition process S24 is discharged to the original document discharge tray 2D. That is, during the shift from S26 to S27, the original document is in course of conveyance to the original document discharge tray 2D.

In S27, the CPU 11 executes a first position conveying process. In the first position conveying process S27, the CPU 11 controls the tray motor 2C to arrange the original document discharge tray 2D at the first position X (see FIG. 3). The CPU 11 controls to discharge the original document to the original document discharge tray 2D arranged at the first position X. After the original document is discharged to the original document discharge tray 2D arranged at the first position, the CPU 11 shifts the process to S29.

On the other hand, in S28 to which the process is shifted when one page of the original document conveyed in the identification data acquisition process S24 corresponds to the non-target set original document 80 (S25: NO), the CPU 11 executes a second position conveying process. At the time when the second position conveying process S28 starts, the original document is in course of conveyance to the original document discharge tray 2D. In the second position conveying process S28, the CPU 11 controls the tray motor 2C to arrange the original document discharge tray 2D at the second position Y (see FIG. 3). The CPU 11 controls to discharge the original document to the original document discharge tray 2D arranged at the second position Y. After the original document is discharged to the original document discharge tray 2D arranged at the second position Y, the CPU 11 shifts the process to S29.

As described above, an original document corresponding to the target set original document 75 within the target original document 70 is discharged to the original document discharge tray 2D arranged at the first position X. On the other hand, an original document corresponding to the non-target set original document 80 is discharged to the original document discharge tray 2D placed at the second position. Here, the original document discharged into the original document discharge tray 2D moves along with the original document discharge tray 2D without changing a position with respect to the original document discharge tray 2D. As shown in FIG. 3, in any of the target set original document 75 and the non-target set original document 80, the target original document 70 is discharged from a predetermined original document discharge position P onto the original document discharge tray 2D. Accordingly, the facsimile apparatus 1 can discharge the target original document 70 onto the original document discharge tray 2D in a manner in which the target set original document 75 and the non-target set original document 80 are displaced from each other (see FIG. 16).

In S29, the CPU 11 determines whether a numerical value of the number-of-matches counter is the same as that of the number-of-sheets data configuring the transmission history data. That is, in S29, the CPU 11 determines whether all original documents corresponding to the target set original document 75 are extracted from the target original document 70. When the numerical value of the number-of-matches counter is the same as that of the number-of-sheets data (S29: YES), the CPU 11 shifts the process to S31. On the other hand, when the numerical value of the number-of-matches counter is different from that of the number-of-sheets data (S29: NO), the CPU 11 shifts the process to S30.

In S30, the CPU 11 determines whether the process (S24 to S29) for all original documents configuring the target original document 70 ends. When the process for all target original documents 70 is completed (S30: YES), the CPU 11 shifts the process to S31. On the other hand, when the process for all the target original documents 70 is not completed (S30: NO), the CPU 11 returns the process to S24. In this case, the CPU 11 executes the process (S24 to S29) for the next page in the target original document 70.

In S31, the CPU 11 executes an extraction result notification (indication) process. In this extraction result notification process S31, the CPU 11 displays (indicates) an extraction result notification screen based on a result of the transmission history designating extraction process on the LCD 18 (see FIG. 17). After the extraction result notification screen is displayed on the LCD 18 and the extraction result is reported to the user, the CPU 11 ends the extraction result notification process. When the extraction result notification process S31 ends, the CPU 11 ends the transmission history designating extraction process program.

Here, the extraction result notification process S31 is executed in the above-described two cases. The first case is that all original documents corresponding to the target set original document 75 are extracted from the target original document 70 (S29: YES). In this case, in the extraction result notification process S31, the CPU 11 displays an extraction result notification screen indicating that all the original documents configuring the target set original document 75 are extracted on the LCD 18.

On the other hand, the second case is that an original document included in the target set original document 75 is not extracted from the target original document 70 (S29: NO and S30: YES). That is, this case is that a process for all target original documents 70 ends before all the original documents corresponding to the target set original documents 75 are extracted from the target original documents 70. In this case, in the extraction result notification process S31, the CPU 11 displays an extraction result notification screen indicating that a missing original document required to configure the whole target set original document 75 exists on the LCD 18 (see FIG. 17).

Figure 17:
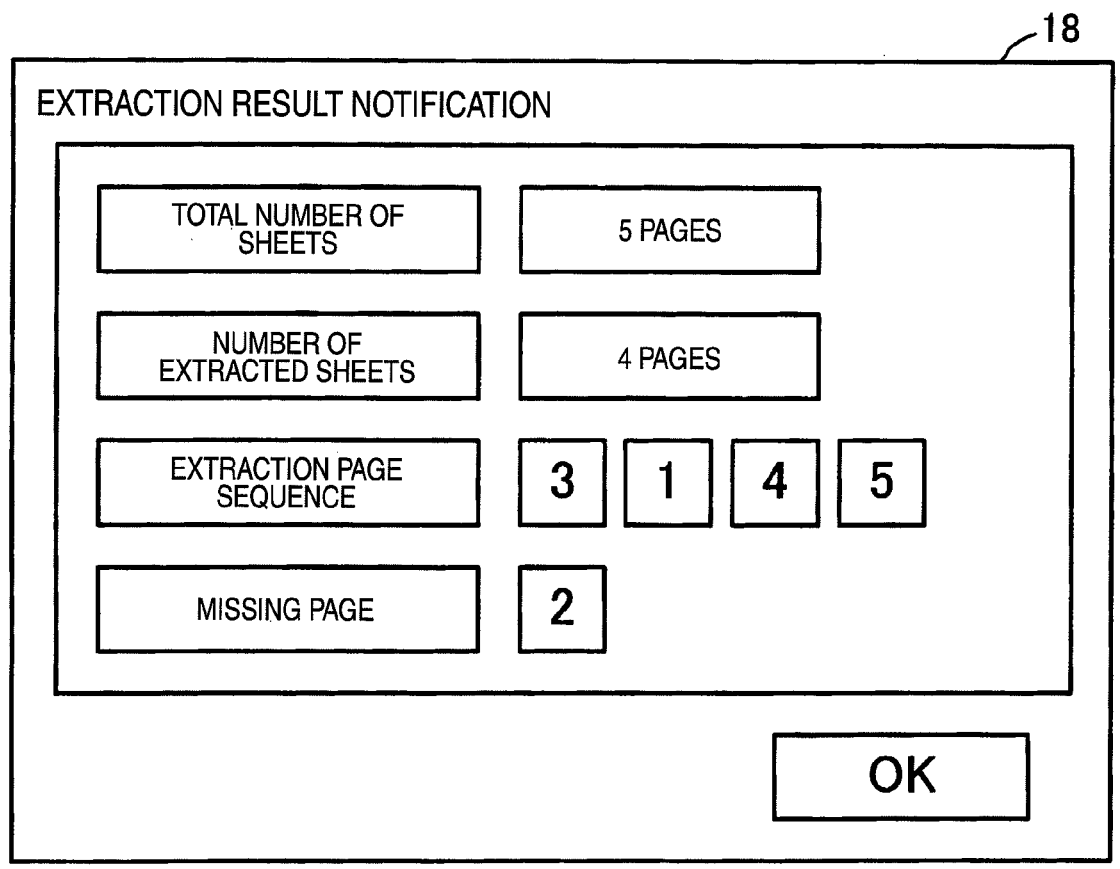
FIG. 17 is an illustrative view showing a display example of an extraction result notification screen in the facsimile apparatus.

As shown in FIG. 17, four items of the "total number of sheets", the "number of extracted sheets", the "extracted page sequence", and a "missing page" are displayed on the extraction result notification screen. The "total number of sheets" indicates the total number of original document sheets corresponding to the target set original document. That is, the "total number of sheets" is displayed based on number-of-sheets data of transmission history data selected in the transmission history selection process S22. The "number of extracted sheets" indicates the number of original document sheets corresponding to the target set original document 75 extracted from the target original document 70. That is, the "number of extracted sheets" is displayed on the basis of a numerical value of the number-of-sheets counter. In the above-described first case, the "total number of sheets" and the "number of extracted sheets" are same as each other since all original documents corresponding to the target set original documents 75 are extracted. On the other hand, in the second case, a numerical value indicating the "number of extracted sheets" (for example, a value of "4 pages") is less than a numerical value indicating the "total number of sheets" (for example, "5 pages").

In an "extraction page sequence", a sequence number of the original document corresponding to a target set original document 75 extracted from the target original document 70 is indicated by a page number. As described above, the process of S24 to S29 is executed for the target original document 70 on a page-by-page basis. Accordingly, page number data acquired from the wireless tag 62 of an original document corresponding to the target set original document 75 is also stored in the RAM 13 according to an extracted sequence number. The CPU 11 can display the "extraction page sequence" in the above-described manner based on page number data included in identification data related to the target set original document 75 stored in the RAM 13 and a sequence number in which the page number data is stored.

The "missing page" indicates a missing original document page number required to completely reproduce the target set original document 75 in the target set original document 75 extracted from the target original document 70. This "mission page" is displayed based on each page number data related to the target set original document 75 stored in the RAM 13 and the number-of-sheets data related to the target set original document 75. That is, the CPU 11 specifies the number of original document sheets configuring the target set original document 75 based on the number-of-sheets data and compares the number of sheets with a page number indicated by each page number data. Accordingly, the CPU 11 can specify a page number of the target set original document that is not extracted from the target original document 70 and report the "missing page" based thereon (see FIG. 17). In this regard, since all original documents corresponding to the target set original document 75 are extracted in the above-described first case, the "missing page" in the target set original document 75 is not reported.

Figure 18:
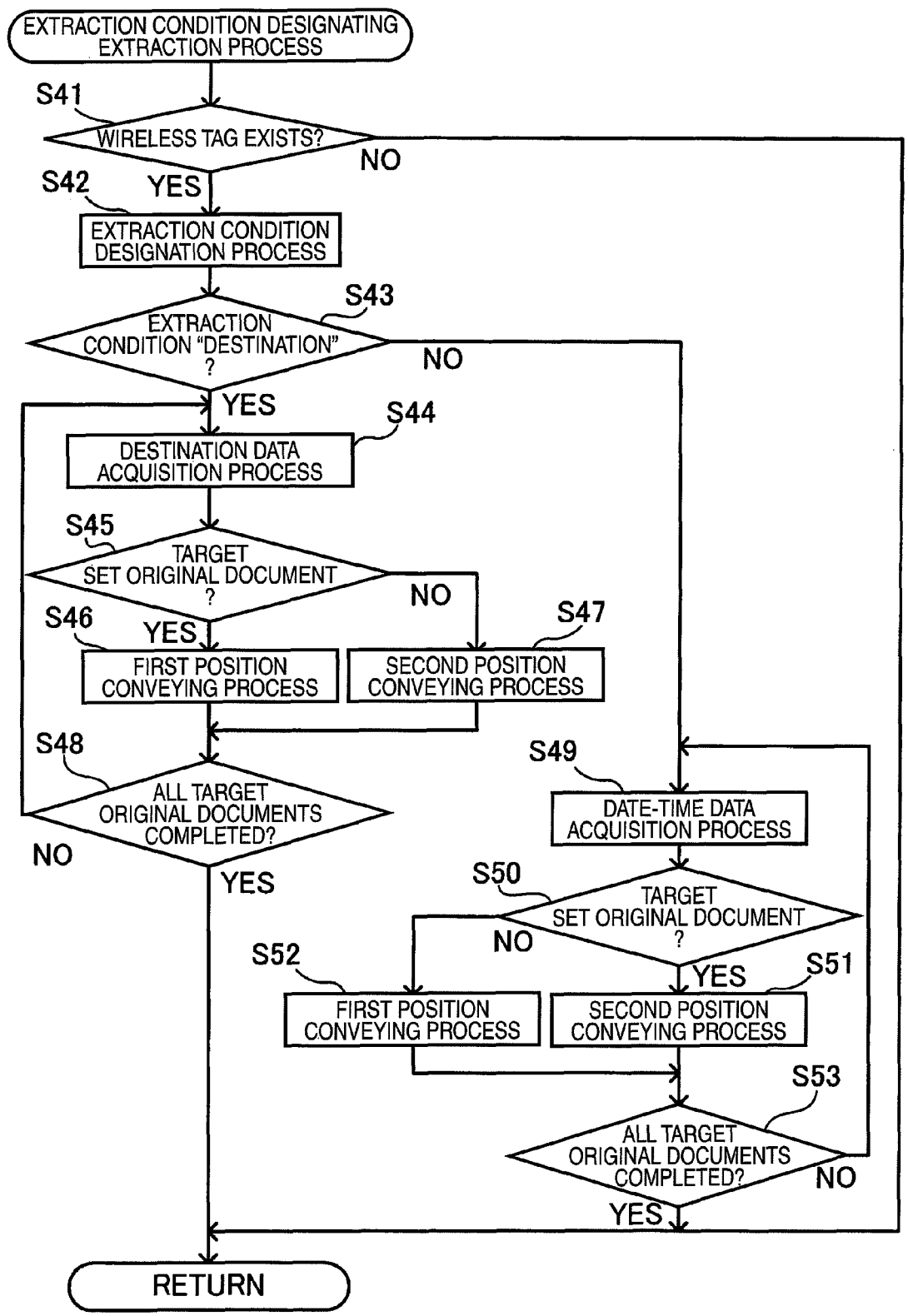
FIG. 18 is a flowchart of an extraction condition designating extraction process program.

Next, the extraction condition designating extraction process program according to this exemplary embodiment will be described in detail with reference to the drawings. FIG. 18 is a flowchart of the extraction condition designating extraction process program. As described above, the extraction condition designating extraction process program is executed by the CPU 11 in the extraction condition designating extraction process S7. Also in the description of the extraction condition designating extraction process S7, it is assumed that the target original document 70 is mounted on the original document mounting unit 2A.

In the extraction condition designating extraction process S7, the CPU 11 first determines whether an original document (that is, a transmission original document 61) to which the wireless tag 62 is attached is included in the target original document 70 mounted on the original document mounting unit 2A (S41). This process is same as that of S21 of FIG. 14. When the original document attached with the wireless tag 62 is included in the target original document 70 (S41: YES), the CPU 11 shifts the process to S42. When the original document with the wireless tag 62 is not included in the target original document 70 (S41: NO), the CPU 11 ends the extraction condition designating extraction process program.

In S42, the CPU 11 executes an extraction condition designation process. In the extraction condition designation process S42, the CPU 11 first displays an extraction condition designation screen on the LCD 18 (see FIG. 19). As shown in FIG. 19, a destination extraction condition input field and a date-time extraction condition input field are displayed on the extraction condition designation screen. Accordingly, the user inputs a desired extraction condition in any of the destination extraction condition input field and the date-time extraction condition input field by operating the operation panel 17. When the extraction condition is input to the destination extraction condition input field or the date-time extraction condition input field according to a user operation, the CPU 11 stores an input result based on the user operation as the extraction condition in the RAM 13. Thereby, the facsimile apparatus 1 sets the extraction condition in the extraction condition designating extraction process S7. After the input result is stored in the RAM 13, the CPU 11 ends the extraction condition designation process S42 and shifts the process to S43.

Here, extraction condition setting in the extraction condition designation process S42 will be described in more detail. First, a case of setting a destination extraction condition will be described. In this case, the user inputs destination data (for example, a facsimile number) related to the target set original document 75 to the destination extraction condition input field. In the case of FIG. 19, the user operates the operation panel 17 and inputs destination data of "XXX-4567" to the destination extraction condition input field. In this case, the CPU 11 sets content of the input destination data (that is, "XXX-4567") as the destination extraction condition (S42). As a result, the facsimile apparatus 1 can extract a target set original document 75 in which the destination data of "XXX-4567" is written to the wireless tag 62 from the target original document 70 by a process (S44 to S48) to be described later.

In setting destination extraction condition, a destination name stored in a phone book data storage area 142 may be input. In this case, the CPU 11 refers to phone book data corresponding to the input destination name and specifies a facsimile number related to the destination name. The CPU 11 sets the facsimile number as the destination extraction condition.

Subsequently, a case of setting a date-time extraction condition will be described. In this case, the user operates the operation panel 17 and inputs a desired date and time to the date-time extraction condition input field. Here, the date-time extraction condition input field is configured by a start date-time input field and an end date-time input field. The start date-time input field is an input field to which the earliest date and time (for example, "2007/12/15 12:00") are input. The end date-time input field is an input field to which the latest date and time (for example, "2007/12/15 14:00") are input.

Accordingly, the user can input a date and time to each of the start date-time input field and the end date-time input field. In this case, the CPU 11 stores input content of the start date-time input field and the end date-time input field (for example, "2007/12/15 12:00" and "2007/12/15 14:00") as the date-time extraction conditions in the RAM 13 (S42). That is, the CPU 11 can set a target period (that is, a period in which a date and time input to the start date-time input field are set to a start time and a date and time input to the end date-time input field are set to an end time) as a date-time extraction condition.

When a date and time are input to only one of the start date-time input field and the end date-time input field or when the same date and time are input to the start date-time input field and the end date-time input field, the CPU 11 stores one input date and time (for example, "2007/12/15 13:30") as the date-time extraction condition in the RAM 13 (S42). In this case, the CPU 11 sets a specific target date and time input to the date-time extraction condition input field as the date-time extraction condition.

In S43, the CPU 11 determines whether a destination extraction condition is set by the extraction condition designation process S42. Specifically, the CPU 11 refers to the RAM 13 and performs the determination of S43 based on content of the extraction condition designated in the extraction condition designation process S42. When the destination extraction condition is set (S43: YES), the CPU 11 shifts the process to S44. On the other hand, when the destination extraction condition is not set (S43: NO), the CPU 11 shifts the process to S49.

First, the process (S44 to S48) in a case that the destination extraction condition is set will be described. In S44, the CPU 11 performs a destination data acquisition process. In the destination data acquisition process S44, the CPU 11 performs substantially the same process as the above-described identification data acquisition process S24. That is, the CPU 11 acquires destination data included in the identification data from the wireless tag 62 of an original document of one page conveyed from the target original document 70 on the original document mounting unit 2A using the wireless tag reader 15. After the acquired destination data is stored in the RAM 13, the CPU 11 shifts the process to S45.

The destination data acquisition process S44 may be configured to acquire the entire identification data. As described above, the destination data is included as identification detail data in the identification data. Accordingly, the CPU 11 can acquire the destination data related to the original document by acquiring the identification data.

In S45, the CPU 11 determines whether the original document corresponds to the target set original document 75. Specifically, the CPU 11 compares the destination data acquired from the wireless tag 62 of the original document to the destination extraction condition set in the extraction condition designation process S42. The CPU 11 determines whether the original document corresponds to the target set original document 75 according to whether the destination data matches the destination indicated by the destination extraction condition. When the original document corresponds to the target set original document 75 (S45: YES), the CPU 11 shifts the process to S46. On the other hand, when the original document does not correspond to the target set original document 75 (S45: NO), the CPU 11 shifts the process to S47.

In S46, the CPU 11 executes a first position conveying process. This first position conveying process S46 is the same as the above-described first position conveying process S27. Accordingly, a detailed description related to the first position conveying process S46 is omitted. After the original document corresponding to the target set original document 75 is discharged to the original document discharge tray 2D placed at the first position X, the CPU 11 shifts the process to S48.

In S47, the CPU 11 executes a second position conveying process. This second position conveying process S47 is the same as the above-described second position conveying process S28. Accordingly, a detailed description related to the second position conveying process S47 is omitted. Here, since the original document conveyed by the original document conveying mechanism 2B is not the target set original document 75 (S45: NO), it corresponds to the non-target set original document 80. After the original document corresponding to the non-target set original document 80 is discharged to the original document discharge tray 2D placed at the second position Y, the CPU 11 shifts the process to S48.

In S48, the CPU 11 determines whether the process (S44 to S47) for all original documents configuring the target original document 70 ends. When the process for all target original documents 70 is completed (S48: YES), the CPU 11 ends the extraction condition designating extraction process program. On the other hand, when the process for all the target original documents 70 is not completed (S48: NO), the CPU 11 returns the process to S44. In this case, the CPU 11 executes the process (S44 to S47) for an original document related to the next page of the target original document 70.

Accordingly, when the destination extraction condition has been set, the facsimile apparatus 1 stacks the target set original document 75 satisfying the destination extraction condition and the non-target set original document 80 not satisfying the destination extraction condition on the original document discharge tray 2D in a manner (see FIG. 16) in which they are distinguished from each other. As a result, the facsimile apparatus 1 can extract the target set original document 75 transmitted to a user desired destination from the target original document 70. In this case, when the extracted target set original document 75 includes a plurality of set original documents as well as one set original document transmitted in one communication in the case that a plurality of set original documents transmitted to the same destination are included in the target original document 70.

Subsequently, a process (S49 to S53) to be executed in the extraction condition designating extraction process program when the date-time extraction condition is set (S43: NO) will be described. In S49, the CPU 11 executes a date-time data acquisition process. In the date-time data acquisition process S49, the CPU 11 executes substantially the same process as the above-described identification data acquisition process S24. That is, the CPU 11 acquires date-time data included in the identification data from the wireless tag 62 of an original document of one page conveyed from the target original document 70 on the original document mounting unit 2A using the wireless tag reader 15. After the acquired date-time data is stored in the RAM 13, the CPU 11 shifts the process to S50.

The date-time acquisition process S49 may be configured to acquire the entire identification data. As described above, in the identification data, the date-time date is included as identification detail data. Accordingly, the CPU 11 can acquire the date-time data related to the original document by acquiring the identification data.

In S50, the CPU 11 determines whether the original document corresponds to the target set original document 75. Specifically, the CPU 11 compares the date-time data acquired from the wireless tag 62 of the original document to the date-time extraction condition set in the extraction condition designation process S42. The CPU 11 determines whether the original document corresponds to the target set original document 75 according to whether a date and time indicated by the date-time data satisfy the date-time extraction condition (that is, in a period set as the date-time extraction condition or the same date and time). When the original document corresponds to the target set original document 75 (S50: YES), the CPU 11 shifts the process to S51. On the other hand, when the original document does not correspond to the target set original document 75 (S50: NO), the CPU 11 shifts the process to S52.

In S51, the CPU 11 executes a first position conveying process. This first position conveying process S51 is the same as the above-described first position conveying processes S27 and S46. Accordingly, a detailed description related to the first position conveying process S51 is omitted. After the original document corresponding to the target set original document 75 is discharged to the original document discharge tray 2D placed at the first position X, the CPU 11 shifts the process to S53.

In S52, the CPU 11 executes a second position conveying process. This second position conveying process S52 is the same as the above-described second position conveying processes S28 and S47. Accordingly, a detailed description related to the second position conveying process S52 is omitted. Here, since the original document conveyed by the original document conveying mechanism 2B is not the target set original document 75 (S50: NO), it corresponds to the non-target set original document 80. After the original document corresponding to the non-target set original document 80 is discharged to the original document discharge tray 2D placed at the second position Y, the CPU 11 shifts the process to S53.

In S53, the CPU 11 determines whether the process (S49 to S52) for all original documents configuring the target original document 70 ends. When the process for all target original documents 70 is completed (S53: YES), the CPU 11 ends the extraction condition designating extraction process program. On the other hand, when the process for all the target original documents 70 is not completed (S53: NO), the CPU 11 returns the process to S49. In this case, the CPU 11 executes the process (S49 to S52) for an original document related to the next page of the target original document 70.

Accordingly, when the date-time extraction condition has been set, the facsimile apparatus 1 stacks the target set original document 75 satisfying the date-time extraction condition and the non-target set original document 80 not satisfying the date-time extraction condition on the original document discharge tray 2D in a manner (see FIG. 16) in which they are distinguished from each other. As a result, the facsimile apparatus 1 can extract the target set original document 75 transmitted to a user desired date and time from the target original document 70. That is, the facsimile apparatus 1 can extract a target set original document 75 transmitted at a specific data and time from the target original document 70 according to setting content of the date-time extraction condition and extract a target set original document 75 transmitted within a specific period from the target original document 70.

As described above, the facsimile apparatus 1 according to this exemplary embodiment writes the identification data to the wireless tag 62 attached to the transmission original document 61 to be facsimiled in the FAX transmission process S3 (S15). The facsimile apparatus 1 extracts the target set original document 75 corresponding to a user desired extraction condition from the target original document 70 in which the target set original document 75 and the non-target set original document 80 are mixed in the "set original document extraction mode" (S6 and S7). According to the facsimile apparatus 1, the user can acquire a desired target set original document 75 from the target original document 70 without scanning content of each original document included in the target original document 70. As a result, the facsimile apparatus 1 can reduce the workload of the user.

The transmission original document 61 facsimiled once is usually mixed with another original document since its importance becomes low. According to the facsimile apparatus 1, in this regard, the user can extract a desired target set original document 75 from the target original document 70 by setting a desired extraction condition and executing the "set original document extraction mode" (S6 and S7). That is, even under a situation in which the transmission original document 61 transmitted once is mixed with another original document, only the desired target set original document 75 can be extracted by collectively setting a plurality of transmission original documents 61 (that is, the target original document 70) including the desired target set original document on the original document mounting unit 2A. Therefore, the workload of the user can be reduced and the work efficiency of the user can be improved.

In the extraction condition designating extraction process S7, the facsimile apparatus 1 sets extraction conditions related to identification detail data (that is, destination data and date-time data) included in the identification data on the basis of an operation of the user (S42). The facsimile apparatus 1 extracts the target set original document 75 from the target original document 70 based on the extraction conditions related to set identification detail data (S44 to S48 and S49 to S52). Accordingly, the facsimile apparatus 1 can surely extract a user desired target set original document 75 from among large amount of target original documents 70 and therefore reduce the workload of the user.

When facsimile transmission is performed in the FAX transmission process S3, the facsimile apparatus 1 stores transmission history data related to the facsimile transmission in the transmission history storage area 141 (S19). Transmission history data has data of the same content as identification detail data of destination data, date-time data, etc. as the history detail data. In the transmission history designating extraction process S6, the facsimile apparatus 1 sets content of user desired transmission history data within the transmission history data stored in the transmission history storage area 141 as the extraction conditions (S22 and S23). The facsimile apparatus 1 extracts the target set original document 75 from the target original document 70 on the basis of the extraction conditions corresponding to the transmission history on the basis of user operation (S24 to S31). According to the facsimile apparatus 1, the user can surely set the extraction conditions corresponding to a desired target set original document 75 using the transmission history data. As a result, the user can surely acquire the desired target set original document 75 from the large amount of target original document 70. In this case, only a set original document transmitted in one communication can be extracted surely. That is, the facsimile apparatus 1 can reduce the workload of the user to select the target set original document 75 from the large amount of target original document 70. In particular, when the original document previously transmitted in one communication is searched from the target original document 70, the facsimile apparatus 1 can simplify the workload of the user.

When the transmission original document 61 is facsimiled (S3), the facsimile apparatus 1 stores number-of-sheets data as history detail data configuring transmission history data (S19). The facsimile apparatus 1 counts the number of times of extracting the target set original document 75 from the target original document 70 (S26). When the count result is less than a numerical value indicated by number-of-sheets data corresponding to the target set original document 75 (S29: NO and S30: YES), the facsimile apparatus 1 displays an extraction result notification screen (see FIG. 17) indicating that a missing original document required to configure the whole target set original document 75 exists on the LCD 18 (S31). Thereby, according to the facsimile apparatus 1, the user can detect that there is a missing transmission original document 61 in the target original document 70 when the target set original document 75 is reproduced based on notification content of the extraction result notification screen, and can make a proper countermeasure (for example, a search or addition of the missing transmission original document 61, etc.).

In the FAX transmission process S3, the facsimile apparatus 1 writes page number data indicating a transmission sequence (that is, a read sequence of original document data) as identification detail data to the wireless tag 62 of each transmission original document 61 (S15). The facsimile apparatus 1 displays the page number corresponding to each of the "extraction page sequence" and the "missing page" of the extraction result notification screen (see FIG. 17) (S31). According to the facsimile apparatus 1, the user can easily specify the transmission original document 61 (that is, the transmission original document 61 related to a specific page) required to reproduce the target original document 70 and make a proper countermeasure (for example, a search or addition of a missing page original document, etc.).

As shown in FIG. 17, the facsimile apparatus 1 displays a page number acquired from the wireless tag 62 of the target set original document 75 in the sequence of extracting the target set original document 75 from the target original document 70 in the "extraction page sequence" of the extraction result notification screen (S31). As a result, according to the facsimile apparatus 1, the user can easily arrange and change a sequence of the extracted target set original document 75 on the basis of display content of the extraction result notification screen to a regular sequence in the target set original document 75 (for example, a sequence upon facsimile transmission of the target set original document 75 (S3)). Accordingly, when the extracted original document is facsimiled, the facsimile apparatus 1 can prevent information based on the target set original document 75 from being transmitted to a destination in an erroneous page sequence and correctly transmit information content that the user desires to transmit.

Even in a state in which the target original document 70 is on the original document mounting unit 2A (S30: NO), the facsimile apparatus 1 ends the process (S24 to S28) for extracting the target set original document 75 when all original documents related to the target set original document 75 are extracted (S29: YES). Accordingly, the facsimile apparatus 1 can reduce its processing load without performing a wasteful process to extract the target set original document 75 for the target original document 70 in which the target set original document 75 is absent.

When the target set original document 75 is extracted from the target original document 70, the facsimile apparatus 1 discharges the target set original document 75 to the original document discharge tray 2D by moving the original document discharge tray 2D to the first position X when the target set original document 75 has been extracted (S27, S46, and S51). When the non-target set original document 80 has been extracted, the facsimile apparatus 1 discharges the non-target set original document 80 to the original document discharge tray 2D by moving the original document discharge tray 2D to the second position Y (S28, S47, and S52). Accordingly, after the extraction process end, the target original document 70 is stacked on the original document discharge tray 2D in a manner in which the target set original document 75 and the non-target set original document 80 can be distinguished from each other (see FIG. 16). As a result, according to the facsimile apparatus 1, the user can easily identify the target set original document 75 configuring the target original document 70 and the non-target set original document 80. Accordingly, the facsimile apparatus 1 can provide the user with the convenience that the target set original document 75 included in the target original document 70 can be easily handled.

While the present invention has been shown and described with reference to certain exemplary embodiments thereof, it will be understood by those skilled in the art that various changes in form and details may be made therein without departing from the spirit and scope of the invention as defined by the appended claims.

For example, this exemplary embodiment is configured such that only one of a destination extraction condition and a date-time extraction condition can be set as the extraction condition in the extraction condition designating extraction process S7, but is not limited thereto. For example, both the destination extraction condition and the date-time extraction condition may be set as the extraction conditions.

In this case, for example, the extraction condition designating extraction process program can be configured as described below. That is, first, the CPU 11 acquires at least both the destination data and the date-time data from the wireless tag 62 of the target original document 70. The CPU 11 determines whether the destination extraction condition is satisfied based on the destination data as identification detail data. When the destination extraction condition is not satisfied, the CPU 11 executes the second position conveying process. For an original document satisfying the destination extraction condition, the CPU 11 determines whether the date-time extraction condition is satisfied. When the date-time extraction condition is not satisfied, the CPU 11 performs the second position conveying process. For an original document satisfying the destination extraction condition and the date-time extraction condition, the CPU 11 executes the first position conveying process. By making a configuration as described above, the facsimile apparatus 1 can extract the target set original document 75 satisfying both the extraction conditions from the target original document 70.

This exemplary embodiment configures the original document discharge tray 2D that can move between the first position X and the second position Y and discharge the target set original document 75 included in the target original document 70 and the non-target set original document 80 in a manner in which they can be discriminated from each other (see FIG. 16), but is not limited thereto. For example, a configuration can be made to install a plurality of original document discharge trays on an automatic original document feeder 2 and discharge the target set original document 75 and the non-target set original document 80 to different original document discharge trays.

This exemplary embodiment is configured to use "destination data", "date-time data", and "page number data" as identification detail data and use "destination data", "date-time data", and "number-of-sheets data" as history detail data, but is not limited thereto. That is, various information elements can be used as long as they are capable of identifying a specific original document (that is, a target set original document 75). For example, it is possible to add data indicating a creator of a corresponding original document, or information indicating a person who performs facsimile transmission.

In this exemplary embodiment, a case that a set original document transmitted in one communication is retransmitted by a facsimile has been described, However, when a set original document transmitted in one communication is copied, identification data written to the above-described wireless tag may be used. For that matter, in the FAX transmission process S3, a process for writing identification data capable of identifying an original document handled in one communication of facsimile transmission to a wireless tag of the original document is performed. On the other hand, in the case of desiring to re-extract the same set of original documents from a large amount of original document in a state in which identification data capable of identifying an original document copied as a set of original documents is written to the original document serving as a master copy, the identification data written to the wireless tag of the master copy can be used.

What is claimed is:

1. A communication apparatus comprising:
   a reading unit which reads original document data from each of a plurality of pages of a specific original document, each of the plurality of pages of the specific original document having a wireless tag attached thereto;
   a transmission unit which transmits original document data read by the reading unit to a designated destination based on transmission history information input into the communication apparatus;
   a history extraction condition setting unit which receives input for designating the transmission history information for use in extracting the specific original document from a target original document, each of a plurality of pages of the target original document having a wireless tag attached thereto;

an acquisition unit which wirelessly acquires identification information from the wireless tag attached to each of the plurality of pages of the target original document, the identification information identifying which of the plurality of pages of the target original document correspond to the plurality of pages of the specific original document; and an extraction unit which extracts the specific original document from the target original document based on the history information received by the history extraction condition setting unit and the identification information acquired by the acquisition unit.

2. The communication apparatus of claim 1, further comprising a writing unit which wirelessly writes the identification information to a wireless tag attached to each page of the specific original document when the transmission unit transmits the original document data from the specific original document in one communication, wherein the extraction unit extracts the specific original document previously transmitted in one communication from the target original document based on the identification information written by the writing unit and acquired by the acquisition unit.

3. The communication apparatus of claim 1, further comprising:

an extraction condition setting unit which sets information designated from among detail information based on an input from outside, as an extraction condition, the detail information indicating an unique attribute of the specific original document and comprised in the identification information; and an extraction controller which controls the extraction unit to extract the specific original document from the target original document based on the information set by the extraction condition setting unit as the extraction condition.

4. The communication apparatus of claim 3, further comprising:

a writing unit which, when the transmission unit transmits the original document data from the specific original document in one communication, writes at least one of (i) transmission destination information indicating a destination of the original document data from the specific original document and (ii) date-time information indicating a date and time related to a transmission process of the original document data from the specific original document, as the detail information of the identification information, to the wireless tag attached to each page of the specific original document; and a history storage unit which stores at least one of the transmission destination information and the date-time information as history detail information when the transmission unit transmits the original document data read by the reading unit in one communication, wherein the history extraction condition setting unit receives input for designating the history information from among the transmission history information stored in the history storage unit, and wherein the extraction controller controls the extraction unit to extract the specific original document corresponding to the set transmission history information from the target original document, based on (i) the history detail information of the transmission history information designated by the history extraction condition setting unit and (ii) the detail information of the identification information acquired by the acquisition unit.

5. The communication apparatus of claim 4, further comprising:

a history storage controller which stores number-of-pages information indicating a number of pages of the specific original document as the history detail information of the transmission history information for the specific original document in the history storage unit when the transmission unit transmits the original document data from the specific original document in one transmission;

a counting unit which counts a number of pages extracted as the specific original document by the extraction unit from the target original document;

an indication unit which indicates various information; and an indication controller which controls an indication content of the indication unit, wherein when a count result of the counting unit is less than the number-of-pages information of transmission history information for the specific original document, the indication controller controls the indication unit to indicate that a page exists, which is a part of the specific original document but not extracted from the target original document.

6. The communication apparatus of claim 5, wherein when the transmission unit transmits the original document data from the specific original document in one communication, the writing unit writes page information indicating a transmission sequence of the original document data from each page of the transmission original document as the detail information of the identification information to the wireless tag attached to each page of the specific original document, the communication apparatus further comprising a page information storage unit which stores page information acquired from the wireless tag attached to each page of the specific original document at each time when the extraction unit extracts a page included in the specific original document, and wherein the indication controller controls the indication unit to indicate a correspondence relation between the pages of the specific original document and the pages extracted by the extracted unit from the target original document, based on the number-of-pages information for the specific original document stored in the history storage unit and the page information stored in the page information storage unit.

7. The communication apparatus of claim 6, further comprising:

an extraction sequence indication unit which indicates page information acquired from the wireless tag of each page of the specific original document extracted by the extraction unit in an order of extraction by the extraction unit.

8. The communication apparatus of claim 5, further comprising:

a determination unit which determines whether all the page of the specific original document are extracted from the target original document before the acquisition unit acquires identification information for all the pages of the target original document; and an extraction stop unit which controls the acquisition unit to stop acquiring the identification information from the pages of the target original document if the determination unit determines that all the pages of the specific original document are extracted.

9. The communication apparatus of claim 1, further comprising:
- a sheet discharge unit which discharges the pages of the target original document for which the extraction unit has performed an extraction process; and
- a discharge controller which controls the sheet discharge unit to discharge the pages of the target original document such that the pages included in the specific original document and the pages not included in the specific original document are distinguishable, based on an extraction result of the extraction unit.

10. A method for extracting an original document, the method comprising:
- reading first original document data from a first original document comprising a plurality of pages, each of the plurality of pages of the first original document having a wireless tag attached thereto;
- transmitting the first original document data to a designated destination in one communication based on transmission history information;
- wirelessly writing identification information to the wireless tag attached to each page of the first original document, the identification information comprising date-time information indicating date and time related to the one communication of the first original document data;
- receiving at least one of date-time information indicating date and time related to the one communication as transmission history information for use in extracting a second original document from the first original document, each of a plurality of pages of the second original document having a wireless tag attached thereto;
- wirelessly acquiring identification information comprising date-time information from the wireless tag attached to each page of the second original document;
- determining whether a certain page of the second original document corresponds to any one of the plurality of pages of the first original document based on the date-time information acquired from the wireless tag of the certain page of the second original document and the date-time information received as transmission history information; and
- extracting the certain page from the second original document if it is determined that the certain page corresponds to any one of pages of the first original document.

11. A communication apparatus comprising:
- a reading unit which reads original document data from a page of a transmission original document;
- a transmission unit which transmits original document data read by the reading unit to a designated destination;
- an acquisition unit which wirelessly acquires identification information capable of identifying a specific original document transmitted by the transmission unit in one communication from a wireless tag attached to each of a plurality of pages of a target original document;
- an extraction unit which extracts the specific original document from the target original document based on the identification information acquired by the acquisition unit;
- an extraction condition setting unit which sets information designated from among detail information based on an input from outside, as an extraction condition, the detail information indicating an unique attribute of the specific original document and comprised in the identification information;
- an extraction controller which controls the extraction unit to extract the specific original document from the target original document based on the information set by the extraction condition setting unit as the extraction condition;
- a writing unit which, when the transmission unit transmits the original document data from the transmission original document in one communication, writes at least one of (i) transmission destination information indicating a destination of the original document data from the transmission original document and (ii) date-time information indicating a date and time related to a transmission process of the original document data from the transmission original document, as the detail information of the identification information, to a wireless tag attached to each page of the transmission original document;
- a history storage unit which stores transmission history information comprising at least one of the transmission destination information and the date-time information as history detail information at each time when the transmission unit transmits the original document data read by the reading unit in one communication; and
- a history extraction condition setting unit which sets history information designated from among the transmission history information stored in the history storage unit based on an input from outside, as an extraction condition,
- wherein the extraction controller controls the extraction unit to extract the specific original document corresponding to the set transmission history information from the target original document, based on (i) history detail information of the transmission history information set by the history extraction condition setting unit as the extraction condition and (ii) detail information of the identification information acquired by the acquisition unit.

12. The communication apparatus of claim 11, further comprising:
- a history storage controller which stores number-of-pages information indicating a number of pages of the transmission original document as the history detail information of the transmission history information for the transmission original document in the history storage unit at each time when the transmission unit transmits the original document data from the transmission original document in one transmission;
- a counting unit which counts a number of pages extracted as the specific original document by the extraction unit from the target original document;
- an indication unit which indicates various information; and
- an indication controller which controls an indication content of the indication unit,
- wherein when a count result of the counting unit is less than the number-of-pages information of transmission history information for the specific original document, the indication controller controls the indication unit to indicate that a page exists, which is a part of the specific original document but not extracted from the target original document.

13. The communication apparatus of claim 12,
wherein when the transmission unit transmits the original document data from the transmission original document in one communication, the writing unit writes page information indicating a transmission sequence of the original document data from each page of the transmission original document as the detail information of the identification information to the wireless tag attached to each page of the transmission original document, the communication apparatus further comprising a page information storage unit which stores page information acquired from the wireless tag attached to each page of the specific original document at each time when the extraction unit extracts a page included in the specific original document, and wherein the indication controller controls the indication unit to indicate a correspondence relation between the pages of the specific original document and the pages extracted by the extracted unit from the target original document, based on the number-of-pages information for the specific original document stored in the history storage unit and the page information stored in the page information storage unit.

14. The communication apparatus of claim 13, further comprising:

an extraction sequence indication unit which indicates page information acquired from the wireless tag of each page of the specific original document extracted by the extraction unit in an order of extraction by the extraction unit.

15. The communication apparatus of claim 12, further comprising:

a determination unit which determines whether all the page of the specific original document are extracted from the target original document before the acquisition unit acquires identification information for all the pages of the target original document; and an extraction stop unit which controls the acquisition unit to stop acquiring the identification information from the pages of the target original document if the determination unit determines that all the pages of the specific original document are extracted.

* * * * *